(12) United States Patent
Li et al.

(10) Patent No.: US 12,108,370 B2
(45) Date of Patent: Oct. 1, 2024

(54) COMMUNICATION METHOD AND APPARATUS FOR DETERMINING A FIRST AND SECOND TIME SUBUNIT

(71) Applicant: HUAWEI TECHNOLOGIES CO., LTD., Guangdong (CN)

(72) Inventors: Xinxian Li, Shanghai (CN); Jiehua Xiao, Shanghai (CN); Hao Tang, Ottawa (CA); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 17/485,152

(22) Filed: Sep. 24, 2021

(65) Prior Publication Data

US 2022/0015098 A1    Jan. 13, 2022

Related U.S. Application Data

(63) Continuation of application No. PCT/CN2020/077314, filed on Feb. 29, 2020.

(30) Foreign Application Priority Data

Mar. 29, 2019   (CN) .......................... 201910247849.1

(51) Int. Cl.
*H04W 72/0446* (2023.01)
*H04L 1/1812* (2023.01)

(52) U.S. Cl.
CPC ....... *H04W 72/0446* (2013.01); *H04L 1/1812* (2013.01)

(58) Field of Classification Search
CPC . H04W 72/0446; H04W 72/23; H04W 72/20; H04L 1/1812; H04L 1/1819;
(Continued)

(56) References Cited

U.S. PATENT DOCUMENTS

2011/0250897 A1* 10/2011 Seo ........................ H04L 5/0044
455/445
2013/0229959 A1* 9/2013 Ghosh ................... H04W 74/08
370/311
(Continued)

FOREIGN PATENT DOCUMENTS

CN        101414902 A    4/2009
CN      1101627567 A    1/2010
(Continued)

OTHER PUBLICATIONS

3GPP TSG RAN WG1 #87,R1-1612744,Flexible frame structure and control signalling for NR,Motorola Mobility,Nov. 14-18, 2016,total 3 pages.
(Continued)

*Primary Examiner* — Afshawn M Towfighi
(74) *Attorney, Agent, or Firm* — HUAWEI TECHNOLOGIES CO., LTD.

(57) ABSTRACT

This application provides a communication method and apparatus. The method includes: A terminal receives first configuration information from a network device, and determines a time unit aggregation based on the first configuration information, where the time unit aggregation includes at least one time unit. The terminal receives control information from the network device, and determines at least one first time subunit and at least one second time subunit in the time unit aggregation based on the control information. The terminal receives, in the at least one first time subunit, data corresponding to a first transport block, and receives, in the at least one second time subunit, data corresponding to a second transport block.

17 Claims, 8 Drawing Sheets

(58) Field of Classification Search
CPC ... H04L 1/1822; H04L 1/1896; H04L 5/0044; H04L 5/0053; H04L 5/001; H04L 5/0023; H04L 5/0048; H04L 5/0055; H04L 5/0091
See application file for complete search history.

(56) References Cited

U.S. PATENT DOCUMENTS

| | | | | |
|---|---|---|---|---|
| 2014/0301322 | A1* | 10/2014 | Yang | H04L 69/04 370/329 |
| 2015/0358115 | A1* | 12/2015 | Wang | H04L 43/0852 714/776 |
| 2016/0095092 | A1* | 3/2016 | Khoryaev | G01S 5/0289 370/329 |
| 2016/0112181 | A1* | 4/2016 | Tabet | H04W 72/21 370/296 |
| 2016/0119948 | A1 | 4/2016 | Damnjanovic et al. | |
| 2016/0234820 | A1* | 8/2016 | Mallik | H04L 1/1861 |
| 2017/0013600 | A1* | 1/2017 | Fan | H04W 48/12 |
| 2018/0242315 | A1 | 8/2018 | Sun et al. | |
| 2020/0177352 | A1* | 6/2020 | Peng | H04L 1/1864 |

FOREIGN PATENT DOCUMENTS

| | | |
|---|---|---|
| CN | 103427964 A | 12/2013 |
| CN | 106105311 A | 11/2016 |
| CN | 107889251 A | 4/2018 |
| CN | 108282297 A | 7/2018 |
| CN | 108365915 A | 8/2018 |
| CN | 108631920 A | 10/2018 |
| CN | 108631960 A | 10/2018 |
| CN | 108633087 A | 10/2018 |
| CN | 108702755 A | 10/2018 |
| CN | 108811112 A | 11/2018 |
| CN | 108988995 A | 12/2018 |
| CN | 109379781 A | 2/2019 |
| CN | 109391422 A | 2/2019 |
| EP | 2779513 A2 | 9/2014 |
| EP | 3425978 A1 | 1/2019 |
| EP | 3541033 A1 | 9/2019 |
| EP | 3579473 A1 | 12/2019 |
| WO | 2018018818 A1 | 2/2018 |
| WO | 2018171737 A1 | 9/2018 |
| WO | 2019028685 A1 | 2/2019 |

OTHER PUBLICATIONS

Samsung, Discussion on time interval X. 3GPP TSG RAN WG1 #86, Gothenburg, Sweden, Aug. 22-26, 2016, R1-166758, 4 pages.
Ericsson, On the operation with different TTI lengths. 3GPP TSG-RAN WG1 #86 bis, Lisbon, Portugal Oct. 10-14, 2016, R1-1610331, 8 pages.
Nokia, Nokia Shanghai Bell, On interaction between different TTI lengths. 3GPP TSG-RAN WG1 Meeting#91, Reno, Nevada (USA), Nov. 27-Dec. 1, 2017, R1-1719845, 8 pages.
3GPP TSG RAN WG1 Meeting #88bis,R1-1704767,On slot aggregation for data transmission ,Intel Corporation, Spokane, USA, Apr. 3-7, 2017,total 4 pages.

* cited by examiner

COMMUNICATION METHOD AND APPARATUS FOR DETERMINING A FIRST AND SECOND TIME SUBUNIT

CROSS-REFERENCE TO RELATED APPLICATIONS

This application is a continuation of International Application No. PCT/CN2020/077314, filed on Feb. 29, 2020, which claims priority to Chinese Patent Application No. 201910247849.1, filed on Mar. 29, 2019. The respective disclosures of the aforementioned applications are hereby incorporated by reference in their entireties.

TECHNICAL FIELD

This application relates to the field of communication technologies, and in particular, to a communication method and apparatus.

BACKGROUND

In a wireless communication network, data receiving and sending corresponding to one transport block (transmission block, TB) may usually occupy one transmission time interval (TTI). For example, in a long term evolution (LTE) network, data receiving and sending corresponding to one TB may occupy one subframe. For another example, in a new radio (NR) network, data receiving and sending corresponding to one TB may occupy one slot. A main problem of the foregoing mechanism is that a time domain resource occupied in terms of time for data receiving and sending corresponding to a TB is not sufficiently flexible, and consequently the time domain resource cannot be more appropriately used based on a data amount of the TB. Therefore, how to design a more flexible time domain resource use manner for data receiving and sending to improve data transmission efficiency becomes an urgent problem to be resolved.

SUMMARY

Embodiments of this application provide a communication method and apparatus.

According to a first aspect, an embodiment of this application provides a communication method, including: receiving control information from a communication device, where the communication device may be a network device, or may be a terminal; determining at least one first time subunit and at least one second time subunit based on the control information, where the at least one first time subunit and the at least one second time subunit are included in the at least one time unit; and receiving first data in the at least one first time subunit, and receiving second data in the at least one second time subunit. Optionally, the time unit is a slot, and the time subunit is a slot or a symbol. Optionally, the at least one time unit is included in a time unit aggregation.

According to the method described in the foregoing embodiment, different time domain resources for carrying different data can be determined in the at least one time unit. Therefore, a time domain resource occupied for data receiving and sending can be flexibly adjusted based on an actual requirement for data transmission, thereby improving data transmission efficiency.

With reference to the first aspect, in some implementations of the first aspect, the control information is used to indicate a position of the at least one first time subunit, or the control information is used to indicate a position of the at least one second time subunit. Alternatively, the control information is used to indicate a position of the at least one first time subunit and a position of the at least one second time subunit. Alternatively, the control information is used to indicate a quantity of the at least one first time subunit, or the control information is used to indicate a quantity of the at least one second time subunit. Alternatively, the control information is used to indicate a quantity of the at least one first time subunit and a quantity of the at least one second time subunit. Alternatively, the control information is used to indicate a ratio of a quantity of the first time subunits to a quantity of the second time subunits. Alternatively, the control information is used to indicate a ratio of a quantity of the second time subunits to a quantity of the first time subunits.

With reference to the first aspect, in some implementations of the first aspect, the control information may be carried by a physical downlink control channel (PDCCH), a physical sidelink control channel (PSCCH), a system message, radio resource control (RRC) signaling, or a media access control (MAC) control element (CE). Alternatively, the control information may be carried by a plurality of the foregoing items.

With reference to the first aspect, in some implementations of the first aspect, the control information includes a bitmap used to indicate the at least one first time subunit and the at least one second time subunit. Optionally, a quantity of bits included in the bitmap is greater than or equal to a quantity of the at least one time unit. Optionally, a bit identified as 0 in the bitmap indicates the at least one first time subunit, and a bit identified as 1 in the bitmap indicates the at least one second time subunit. Alternatively, a bit identified as 1 in the bitmap indicates the at least one first time subunit, and a bit identified as 0 in the bitmap indicates the at least one second time subunit.

With reference to the first aspect, in some implementations of the first aspect, the method further includes: receiving first configuration information from the communication device, where the first configuration information is used to configure the at least one time unit; or receiving first configuration information from the communication device, where the first configuration information is used to configure the at least one time unit, and a quantity of the at least one time unit is two or more than two. If the first configuration information from the communication device is not received, the quantity of the at least one time unit is one by default. Optionally, the first configuration information is used to configure the quantity of the at least one time unit. Optionally, the first configuration information may be carried by a PDCCH, a PSCCH, a system message, RRC signaling, or a MAC CE.

With reference to the first aspect, in some implementations of the first aspect, the first data is data corresponding to a first transport block (transmission block, TB), and the second data is data corresponding to a second transport block TB. A time domain resource occupied for data receiving and sending may be flexibly adjusted based on amounts of data corresponding to different TBs. Therefore, data transmission efficiency and resource use efficiency can be improved.

With reference to the first aspect, in some implementations of the first aspect, the first data is data corresponding to a first hybrid automatic repeat request (HARQ) process, and the second data is data corresponding to a second HARQ process. A time domain resource occupied for data receiving and sending may be flexibly adjusted based on amounts of data corresponding to different HARQ processes. Therefore, data transmission efficiency and resource use efficiency can be improved.

With reference to the first aspect, in some implementations of the first aspect, the first data is initially transmitted data, and the second data is retransmitted data. Alternatively, the first data is retransmitted data, and the second data is initially transmitted data. Alternatively, the first data is first initially transmitted data, and the second data is second initially transmitted data. Alternatively, the first data is first retransmitted data, and the second data is second retransmitted data. A time domain resource occupied for data receiving and sending may be flexibly adjusted based on amounts of the initially transmitted data and the retransmitted data. Therefore, data transmission efficiency and resource use efficiency can be improved.

With reference to the first aspect, in some implementations of the first aspect, the first data is data corresponding to a first redundancy version (RV), and the second data is data corresponding to a second RV. A time domain resource occupied for data receiving and sending may be flexibly adjusted based on amounts of data corresponding to different RVs. Therefore, data transmission efficiency and resource use efficiency can be improved.

With reference to the first aspect, in some implementations of the first aspect, the first data is data corresponding to a first service, and the second data is data corresponding to a second service. A time domain resource occupied for data receiving and sending may be flexibly adjusted based on amounts of data corresponding to different services. Therefore, data transmission efficiency and resource use efficiency can be improved.

With reference to the first aspect, in some implementations of the first aspect, the method further includes: receiving first data in the at least one first time subunit based on the control information, and receiving second data in the at least one second time subunit based on the control information. The control information includes scheduling information of the first data and scheduling information of the second data, and the scheduling information includes one or more pieces of information such as resource allocation information and a modulation and coding scheme (MCS). After the control information from the communication device is received and the scheduling information is obtained, the first data may be received in the at least one first time subunit based on the scheduling information, and the second data may be received in the at least one second time subunit based on the scheduling information. In this implementation, signaling overheads for data scheduling can be reduced.

According to a second aspect, an embodiment of this application provides another communication method, including: sending control information to a communication device, where the communication device may be a network device, or may be a terminal, the control information is used to indicate at least one first time subunit and at least one second time subunit, and the at least one first time subunit and the at least one second time subunit are included in the at least one time unit; and sending first data in the at least one first time subunit, and sending second data in the at least one second time subunit. Optionally, the time unit is a slot, and the time subunit is a slot or a symbol. Optionally, the at least one time unit is included in a time unit aggregation.

According to the method described in the foregoing embodiment, different time domain resources for carrying different data can be determined in the at least one time unit. Therefore, a time domain resource occupied for data receiving and sending can be flexibly adjusted based on an actual requirement for data transmission, thereby improving data transmission efficiency.

With reference to the second aspect, in some implementations of the second aspect, the control information is used to indicate a position of the at least one first time subunit, or the control information is used to indicate a position of the at least one second time subunit. Alternatively, the control information is used to indicate a position of the at least one first time subunit and a position of the at least one second time subunit. Alternatively, the control information is used to indicate a quantity of the at least one first time subunit, or the control information is used to indicate a quantity of the at least one second time subunit. Alternatively, the control information is used to indicate a quantity of the at least one first time subunit and a quantity of the at least one second time subunit. Alternatively, the control information is used to indicate a ratio of a quantity of the first time subunits to a quantity of the second time subunits. Alternatively, the control information is used to indicate a ratio of a quantity of the second time subunits to a quantity of the first time subunits.

With reference to the second aspect, in some implementations of the second aspect, the control information may be carried by a PDCCH, a PSCCH, a system message, RRC signaling, or a MAC CE. Alternatively, the control information may be carried by a plurality of the foregoing items.

With reference to the second aspect, in some implementations of the second aspect, the control information includes a bitmap used to indicate the at least one first time subunit and the at least one second time subunit. Optionally, a quantity of bits included in the bitmap is greater than or equal to a quantity of the at least one time unit. Optionally, a bit identified as 0 in the bitmap indicates the at least one first time subunit, and a bit identified as 1 in the bitmap indicates the at least one second time subunit. Alternatively, a bit identified as 1 in the bitmap indicates the at least one first time subunit, and a bit identified as 0 in the bitmap indicates the at least one second time subunit.

With reference to the second aspect, in some implementations of the second aspect, the method further includes: sending first configuration information to the communication device, where the first configuration information is used to configure the at least one time unit; or sending first configuration information to the communication device, where the first configuration information is used to configure the at least one time unit, and a quantity of the at least one time unit is two or more than two. If the first configuration information is not sent, the quantity of the at least one time unit is one by default. Optionally, the first configuration information is used to configure the quantity of the at least one time unit. Optionally, the first configuration information may be carried by a PDCCH, a PSCCH, a system message, RRC signaling, or a MAC CE.

With reference to the second aspect, in some implementations of the second aspect, the first data is data corresponding to a first transport block TB, and the second data is data corresponding to a second transport block TB. A time domain resource occupied for data receiving and sending may be flexibly adjusted based on amounts of data corresponding to different TBs. Therefore, data transmission efficiency and resource use efficiency can be improved.

With reference to the second aspect, in some implementations of the second aspect, the first data is data corresponding to a first HARQ process, and the second data is data corresponding to a second HARQ process. A time domain resource occupied for data receiving and sending may be flexibly adjusted based on amounts of data corresponding to different HARQ processes. Therefore, data transmission efficiency and resource use efficiency can be improved.

With reference to the second aspect, in some implementations of the second aspect, the first data is initially transmitted data, and the second data is retransmitted data. Alternatively, the first data is retransmitted data, and the second data is initially transmitted data. Alternatively, the first data is first initially transmitted data, and the second data is second initially transmitted data. Alternatively, the first data is first retransmitted data, and the second data is second retransmitted data. A time domain resource occupied for data receiving and sending may be flexibly adjusted based on amounts of the initially transmitted data and the retransmitted data. Therefore, data transmission efficiency and resource use efficiency can be improved.

With reference to the second aspect, in some implementations of the second aspect, the first data is data corresponding to a first RV, and the second data is data corresponding to a second RV. A time domain resource occupied for data receiving and sending may be flexibly adjusted based on amounts of data corresponding to different RVs. Therefore, data transmission efficiency and resource use efficiency can be improved.

With reference to the second aspect, in some implementations of the second aspect, the first data is data corresponding to a first service, and the second data is data corresponding to a second service. A time domain resource occupied for data receiving and sending may be flexibly adjusted based on amounts of data corresponding to different services. Therefore, data transmission efficiency and resource use efficiency can be improved.

With reference to the second aspect, in some implementations of the second aspect, the control information includes scheduling information of the first data and scheduling information of the second data, and the scheduling information includes one or more pieces of information such as resource allocation information and an MCS. In this implementation, signaling overheads for data scheduling can be reduced.

According to a third aspect, an embodiment of this application provides another communication method, including: receiving second configuration information from a communication device, where the second configuration information is used to configure a quantity of time units, a maximum quantity of time units, or a set of quantities of time units in a time unit aggregation corresponding to a bandwidth part (BWP), and the communication device may be a network device, or may be a terminal; and receiving or sending third data in the BWP in one or more time units in the time unit aggregation.

The BWP may be understood as a physical resource. The BWP may include at least one resource block group (RBG), at least one physical resource block group (PRG), at least one resource block (resource block, RB), or at least one subcarrier (SC) in frequency domain. The RBG, the PRG, the RB, and the SC may also be understood as physical resources in frequency domain.

According to the foregoing method, the quantity of time units included in the time unit aggregation corresponding to the BWP is restricted, so that when transmission is performed in a plurality of time units, transmission is not limited by a predefined transport block size, and a predefined maximum transport block size is not increased, thereby reducing system design complexity.

With reference to the third aspect, in some implementations of the third aspect, the second configuration information is used to configure a quantity A1 of time units in the time unit aggregation corresponding to the BWP, and a quantity of the one or more time units in the time unit aggregation may be equal to A1 or less than A1. It may be understood that the quantity A1 of time units in the time unit aggregation corresponding to the BWP may also be understood as a maximum quantity of time units in the time unit aggregation corresponding to the BWP.

With reference to the third aspect, in some implementations of the third aspect, the second configuration information is used to configure a set {A1, A2, ..., An} of quantities of time units in the time unit aggregation corresponding to the BWP, where n is an integer greater than 1, and a quantity of the one or more time units in the time unit aggregation may be one of elements in the foregoing set.

According to a fourth aspect, an embodiment of this application provides another communication method, including: sending second configuration information to a terminal, where the second configuration information is used to configure a quantity of time units, a maximum quantity of time units, or a set of quantities of time units in a time unit aggregation corresponding to a bandwidth part; and sending or receiving third data in the bandwidth part in one or more time units in the time unit aggregation.

According to the foregoing method, the quantity of time units included in the time unit aggregation corresponding to the BWP is restricted, so that when transmission is performed in a plurality of time units, transmission is not limited by a predefined transport block size, and a predefined maximum transport block size is not increased, thereby reducing system design complexity.

According to a fifth aspect, an embodiment of this application provides another communication method, including: obtaining a reference transport block size corresponding to a reference time unit; and determining, based on the reference transport block size, an actual transport block size corresponding to a plurality of time units (M time units, where M is an integer greater than 1). Optionally, the plurality of time units are included in a time unit aggregation, or the plurality of time units constitute a time unit aggregation. The time unit aggregation may also be understood as a set of time units.

According to the foregoing method, when transmission is performed in a plurality of time units, a transport block size used for transmission in the plurality of time units can be accurately and conveniently obtained, thereby reducing implementation complexity of a network device or a terminal.

With reference to the fifth aspect, in some implementations of the fifth aspect, it is obtained that the reference transport block size corresponding to the reference time unit is N (where N is an integer greater than 0). The determining the actual transport block size corresponding to the M time units based on the reference transport block size N includes that the actual transport block size N' corresponding to the M time units satisfies one of the following:

N'=N*M, N'=N*M*C1, N'=f(N*M*C1), N'=N*M/C2, or N'=f(N*M/C2), where C1 and C2 are positive real numbers, and f(x) represents rounding x.

With reference to the fifth aspect, in some implementations of the fifth aspect, the reference time unit includes a first reference time unit and a second reference time unit. It is obtained that a reference transport block size corresponding to the first reference time unit is J (where J is an integer greater than 0), and it is obtained that a reference transport block size corresponding to the second reference time unit is K (where K is an integer greater than 0). The first reference time unit may be understood as a reference time unit in which first information and/or a first signal are/is carried, and the second reference time unit may be understood as a reference time unit in which the first information and/or the first signal are/is not carried. Determining the actual transport block size corresponding to the M time units based on the reference transport block sizes J and K includes that the actual transport block size N' corresponding to the M time units satisfies one of the following:

N'=J*L+K*(M−L), N'=J*L*C3+K*(M−L)*C4, or N'=f (J*L*C3+K*(M−L)*C4), where L is a quantity of time units in which the first information and/or the first signal are/is carried in the M time units, C3 and C4 are positive real numbers, and f(x) represents rounding x.

It may be understood that the first information and/or the first signal may include one or more of the following: control information, a reference signal, a synchronization signal (SS), a synchronization signal block (SSB), or a random access signal. The control information includes uplink control information (UCI) and/or downlink control information (DCI) that are/is carried by a control channel. The reference signal includes one or more of a demodulation reference signal (DMRS), a phase tracking reference signal (PTRS), a sounding reference signal (SRS), or a channel state information reference signal (CSI-RS). The synchronization signal includes a primary synchronization signal (PSS) and/or a secondary synchronization signal (SSS). The synchronization signal block includes a synchronization signal and/or a physical broadcast channel (PBCH).

According to the foregoing implementation, when the time unit aggregation includes both a time unit in which the first information and/or the first signal are/is carried and a time unit in which the first information and/or the first signal are/is not carried, a required transport block size can be more accurately calculated, thereby improving time resource utilization.

According to a sixth aspect, an embodiment of this application provides another communication method, including: obtaining a quantity of resource elements (resource element) corresponding to a plurality of time units, where optionally, the plurality of time units are included in a time unit aggregation, or the plurality of time units constitute a time unit aggregation, and the time unit aggregation may also be understood as a set of time units; and determining, based on the quantity of REs, an actual transport block size corresponding to the plurality of time units.

The RE in this embodiment of this application may be understood as a physical resource. Optionally, one RE may occupy one subcarrier in frequency domain, and may occupy one symbol in time domain.

According to the foregoing method, when transmission is performed in a plurality of time units, a transport block size used for transmission in the plurality of time units can be accurately and conveniently obtained, thereby reducing implementation complexity of a network device or a terminal.

With reference to the sixth aspect, in some implementations of the sixth aspect, the time unit is a slot. It is obtained that a quantity of REs corresponding to a plurality of slots is $N_{RE}$, and satisfies $N_{RE}=N_{sc}^{RB}*N_{symb}^{sh}-N_{DMRS}^{PRB}-N_{oh}^{PRB}$, where $N_{sc}^{RB}$ is a quantity of subcarriers (where for example, $N_{sc}^{RB}=12$) included in one RB, $N_{symb}^{sh}$ is a quantity of symbols scheduled in the plurality of slots, $N_{DMRS}^{PRB}$ is a quantity of REs occupied by a DMRS in the plurality of slots, and $N_{oh}^{PRB}$ is a quantity of REs included in other overheads (for example, overheads configured through higher layer signaling).

According to a seventh aspect, an embodiment of this application provides a communication apparatus, to implement the method in one or more of the first aspect, any possible implementation of the first aspect, the second aspect, any possible implementation of the second aspect, the third aspect, any possible implementation of the third aspect, the fourth aspect, any possible implementation of the fourth aspect, the fifth aspect, any possible implementation of the fifth aspect, the sixth aspect, or any possible implementation of the sixth aspect. The communication apparatus includes a corresponding unit or component configured to perform the foregoing method. The unit included in the communication apparatus may be implemented by using software and/or hardware. For example, the communication apparatus may be a terminal, a network device (for example, a base station), or a chip, chip system, processor, or the like that can support a terminal or a network device in implementing the foregoing functions.

According to an eighth aspect, this application provides a communication apparatus, including a processor, where the processor is coupled to a memory, and the memory is configured to store a program or instructions. When the program or the instructions is/are executed by the processor, the communication apparatus is enabled to implement the method according to the first aspect, any possible implementation of the first aspect, the second aspect, any possible implementation of the second aspect, the third aspect, any possible implementation of the third aspect, the fourth aspect, any possible implementation of the fourth aspect, the fifth aspect, any possible implementation of the fifth aspect, the sixth aspect, or any possible implementation of the sixth aspect.

According to a ninth aspect, this application provides a storage medium, where the storage medium stores a computer program or instructions. When the computer program or the instructions is/are executed, a computer is enabled to perform the method according to the first aspect, any possible implementation of the first aspect, the second aspect, any possible implementation of the second aspect, the third aspect, any possible implementation of the third aspect, the fourth aspect, any possible implementation of the fourth aspect, the fifth aspect, any possible implementation of the fifth aspect, the sixth aspect, or any possible implementation of the sixth aspect.

According to a tenth aspect, an embodiment of this application provides a communication system, including a communication apparatus configured to perform the method according to the first aspect, any possible implementation of the first aspect, the second aspect, any possible implementation of the second aspect, the third aspect, any possible implementation of the third aspect, the fourth aspect, any possible implementation of the fourth aspect, the fifth aspect, any possible implementation of the fifth aspect, the sixth aspect, or any possible implementation of the sixth aspect.

DESCRIPTION OF EMBODIMENTS

Figure 1:
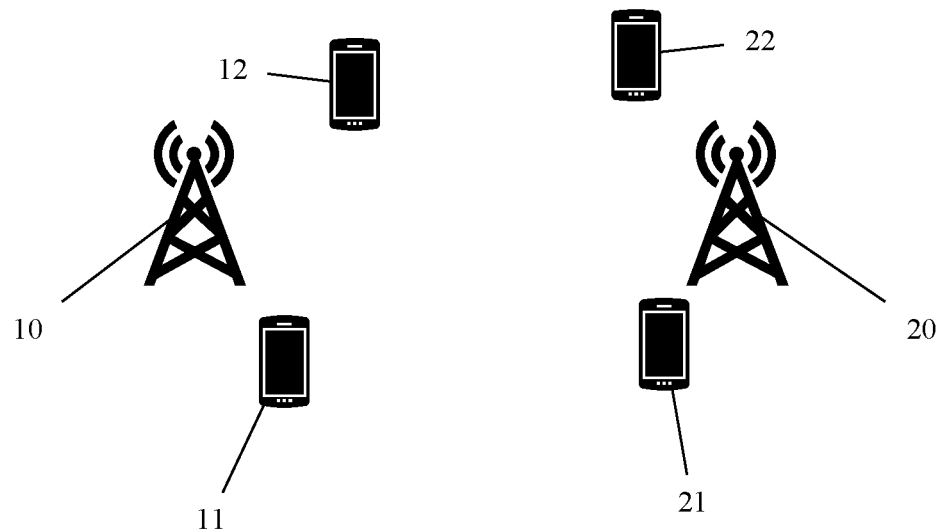
FIG. 1 is a schematic diagram of a communication system to which an embodiment of this application is applied.

The communication method and apparatus provided in the embodiments of this application may be applied to a communication system. FIG. 1 is a schematic structural diagram of a communication system. The communication system includes one or more network devices (where for clarity, a network device 10 and a network device 20 are shown in the figure), and one or more terminal devices that communicate with the one or more network devices. As shown in FIG. 1, a terminal device 11 and a terminal device 12 communicate with the network device 10, and a terminal device 21 and a terminal device 22 communicate with the network device 20. It may be understood that the network devices and the terminal devices may also be referred to as communication devices.

The technologies described in the embodiments of the present invention may be used in various communication systems, for example, 2G, 3G, 4G, 4.5G, and 5G communication systems, a system in which a plurality of communication systems are integrated, or a future evolved network, for example, a long term evolution (LTE) system, a new radio (NR) system, a wireless fidelity (WiFi) system, a cellular system related to the 3rd generation partnership project (3GPP), and another communication system of this type.

Figure 2:
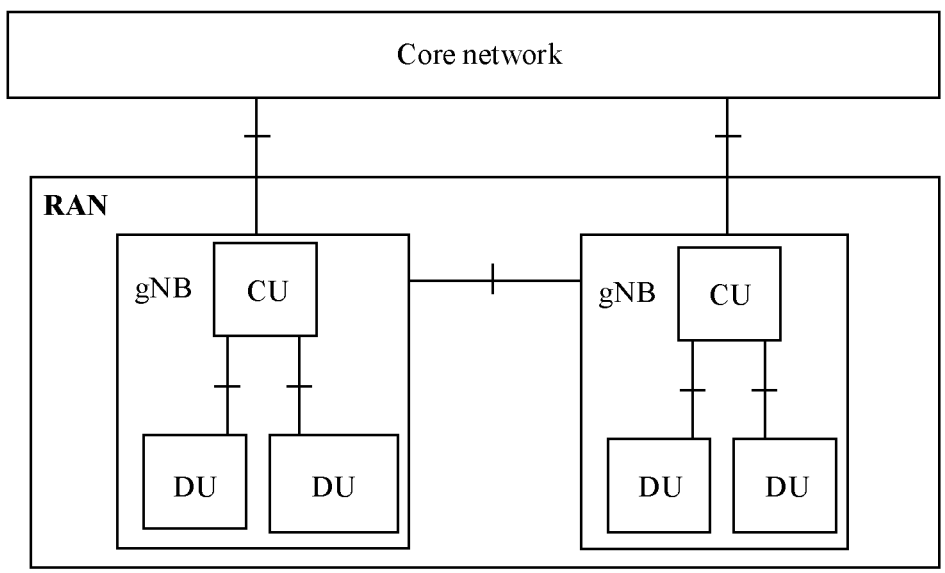
FIG. 2 is a schematic diagram of an example of an architecture of a communication system.

FIG. 2 is a schematic diagram of an example of a possible architecture of a communication system. As shown in FIG. 2, a network device in a radio access network (RAN) is a base station (for example, a gNodeB or a gNB) with an architecture in which a centralized unit (CU) and a distributed unit (DU) are separated. The RAN may be connected to a core network (for example, an LTE core network or a 5G core network). The CU and the DU may be understood as division of the base station from a perspective of a logical function. The CU and the DU may be physically separated or physically deployed together. A plurality of DUs may share one CU. One DU may alternatively be connected to a plurality of CUs (not shown in the figure). The CU and the DU may be connected through an interface, for example, an F1 interface. The CU and the DU may be obtained through division based on protocol layers of a wireless network. For example, functions of a packet data convergence protocol (PDCP) layer and a radio resource control (RRC) layer are distributed on the CU, but functions of a radio link control (radio link control, RLC) layer, a media access control (MAC) layer, and a physical layer are distributed on the DU. It may be understood that, division into processing functions of the CU and the DU based on the protocol layers is merely an example, and the processing functions of the CU and the DU may alternatively be obtained through division in another manner. For example, the CU or the DU may be obtained through division to have functions of more protocol layers. For example, the CU or the DU may alternatively be obtained through division to have some processing functions of protocol layers. In a design, some functions of the RLC layer and functions of a protocol layer above the RLC layer are distributed on the CU, and remaining functions of the RLC layer and functions of a protocol layer below the RLC layer are distributed on the DU. In another design, functions of the CU or the DU may alternatively be obtained through division based on a service type or another system requirement. For example, division is performed based on a delay. Functions whose processing time needs to meet a delay requirement are distributed on the DU, and functions that do not need to meet the delay requirement are distributed on the CU. The network architecture shown in FIG. 2 may be used in a 5G communication system, and may alternatively share one or more components or resources with an LTE system. In another design, the CU may alternatively have one or more functions of a core network. One or more CUs may be disposed in a centralized manner or a separated manner. For example, the CUs may be disposed on a network side to facilitate centralized management. The DU may have a plurality of radio frequency functions, and the radio frequency functions may be remotely set.

The functions of the CU may be implemented by one entity. Alternatively, a control plane (CP) and a user plane (UP) may be further separated. To be specific, the control plane of the CU (CU-CP) and the user plane of the CU (CU-UP) may be implemented by different function entities, and the CU-CP and the CU-UP may be coupled to the DU to jointly implement a function of the base station.

It may be understood that the embodiments provided in this application are also applicable to an architecture in which the CU and the DU are not separated.

In this application, the network device may be any device having a wireless transceiver function, and includes but is not limited to: an evolved NodeB (NodeB or eNB or e-NodeB, evolutional Node B) in LTE, a base station (gNodeB or gNB) or a transmission reception point (transmission receiving point/transmission reception point, TRP) in NR, a base station that subsequently evolves in 3GPP, an access node in a Wi-Fi system, a wireless relay node, a wireless backhaul node, or the like. The base station may be a macro base station, a micro base station, a picocell base station, a small cell, a relay station, a balloon station, or the like. A plurality of base stations may support the aforementioned networks of a same technology, or may support the aforementioned networks of different technologies. The base station may include one or more co-site or non-co-site TRPs. The network device may alternatively be a radio controller, a CU, and/or a DU in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with a terminal device, or may communicate with a terminal device through a relay station. The terminal device may communicate with a plurality of base stations using different technologies. For example, the terminal device may communicate with a base station supporting an LTE network, may communicate with a base station supporting a 5G network, and may further support a dual connection to a base station in an LTE network and a base station in a 5G network.

The terminal is a device having a wireless transceiver function, and may be deployed on land, including an indoor or outdoor device, a hand-held device, a wearable device, or a vehicle-mounted device; may be deployed on a water surface (for example, on a ship); or may be deployed in the air (for example, on an airplane, a balloon, or a satellite). The terminal may be a mobile phone, a tablet computer (Pad), a computer with a wireless transceiver function, a virtual reality (VR) terminal device, an augmented reality (AR) terminal device, a wireless terminal in industrial control, a vehicle-mounted terminal device, a wireless terminal in self-driving or autonomous vehicle, a wireless terminal in telemedicine (remote medical), a wireless terminal in a smart grid, a wireless terminal in transportation safety, a wireless terminal in a smart city, a wireless terminal in a smart home, a wearable terminal device, or the like. An application scenario is not limited in the embodiments of this application. The terminal sometimes may also be referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a terminal device, a wireless communication device, a UE agent, a UE apparatus, or the like. The terminal may be fixed or mobile.

In a wireless communication network, data receiving and sending corresponding to one transport block (TB) may usually occupy one transmission time interval (TTI). For example, in a long term evolution (LTE) network, data receiving and sending corresponding to one TB may occupy one subframe. For another example, in a new radio (NR) network, data receiving and sending corresponding to one TB may occupy one slot. A main problem of the foregoing mechanism is that a time domain resource occupied in terms of time for data receiving and sending corresponding to a TB is not sufficiently flexible, and consequently the time domain resource cannot be more appropriately used based on a data amount of the TB. Therefore, how to design a more flexible time domain resource use manner for data receiving and sending to improve data transmission efficiency becomes an urgent problem to be resolved.

In the method provided in the embodiments of this application, the communication device can determine different time domain resources for carrying different data in a time unit aggregation. Therefore, a time domain resource occupied for data receiving and sending can be flexibly adjusted based on an actual requirement for data transmission, thereby improving data transmission efficiency.

The following describes the technical solutions of this application in detail by using specific embodiments with reference to the accompanying drawings. The following embodiments and implementations may be combined with each other, and same or similar concepts or processes may not be described repeatedly in some embodiments. It should be understood that a function explained in this application may be implemented by using an independent hardware circuit, software running in combination with a processor/microprocessor or a general-purpose computer, an application-specific integrated circuit, and/or one or more digital signal processors. When described as a method, this application may alternatively be implemented in a computer processor and a memory coupled to the processor.

Figure 3:
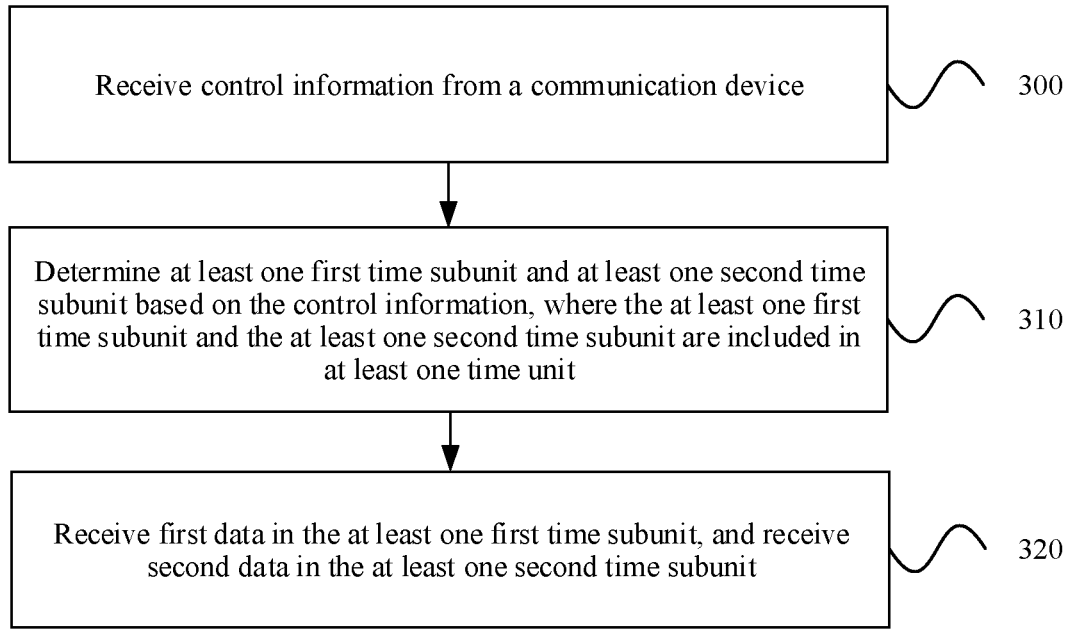
FIG. 3 is a schematic flowchart of a communication method according to an embodiment of this application.

FIG. 3 is a schematic flowchart of a communication method according to an embodiment of this application. The method may be performed by a terminal. As shown in FIG. 3, the method in this embodiment may include the following parts.

Part 300: Receive control information from a communication device. The communication device may be a network device, or may be a terminal.

Part 310: Determine at least one first time subunit and at least one second time subunit based on the control information, where the at least one first time subunit and the at least one second time subunit are included in at least one time unit. It may be understood that the at least one time unit may include the at least one first time subunit and the at least one second time subunit, or the at least one time unit further includes another time subunit in addition to the at least one first time subunit and the at least one second time subunit. Optionally, the time unit is a slot, and the time subunit is a slot or a symbol (which may also be referred to as a time domain symbol). Alternatively, the time unit is a subframe, and the time subunit is a subframe, a slot, or a symbol. Alternatively, the time unit is a frame, and the time subunit is a frame, a subframe, a slot, or a symbol. A time unit or a time subunit in this embodiment of this application and another embodiment may also be understood as a time domain resource.

Optionally, the at least one time unit is included in a time unit aggregation, or the at least one time unit constitutes a time unit aggregation. The time unit aggregation may also be understood as a set of time units. Optionally, the terminal may report whether the terminal has a capability of supporting the time unit aggregation, or the terminal may report a maximum quantity of time units in a supported time unit aggregation.

Part 320: Receive first data in the at least one first time subunit, and receive second data in the at least one second time subunit.

It may be understood that the at least one time unit may further include more time subunits (for example, at least one third time subunit). For ease of description, this embodiment of this application is subsequently described by using an example in which the at least one time unit includes the at least one first time subunit and the at least one second time subunit.

According to the method described in the foregoing embodiment, the terminal can determine, in the at least one time unit, different time domain resources for carrying different data. Therefore, a time domain resource occupied for data receiving and sending can be flexibly adjusted based on an actual requirement for data transmission, thereby improving data transmission efficiency.

In an optional implementation of the control information, the control information is used to indicate a position of the at least one first time subunit, or the control information is used to indicate a position of the at least one second time subunit. It may be understood that this implementation is applicable to a case in which the at least one time unit includes the at least one first time subunit and the at least one second time subunit. In part 310, the at least one first time subunit may be determined based on the position that is of the at least one first time subunit and that is indicated by the control information. In addition, the at least one time unit includes the at least one first time subunit and the at least one second time subunit. Therefore, the at least one second time subunit may be determined in the at least one time unit. Alternatively, in part 310, the at least one second time subunit may be determined based on the position that is of the at least one second time subunit and that is indicated by the control information. In addition, the at least one time unit includes the at least one first time subunit and the at least one second time subunit. Therefore, the at least one first time subunit may be determined in the at least one time unit. The control information may indicate the position of the at least one first time subunit or the position of the at least one second time subunit, or may indicate an index, a number, or an enumeration parameter corresponding to the position.

Figure 4:
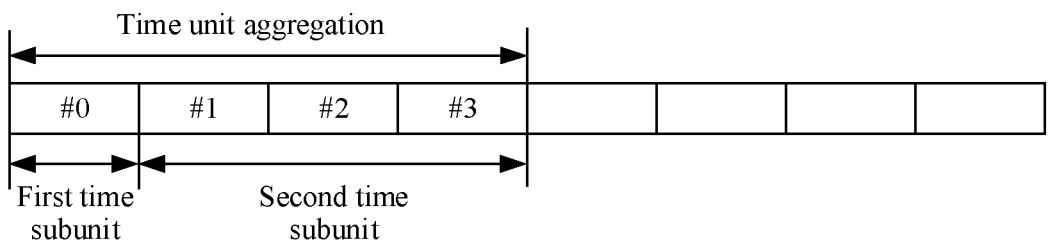
FIG. 4 is a schematic diagram of a time domain resource according to an embodiment of this application.

For example, a time domain resource shown in FIG. 4 is used as an example. In FIG. 4, an example in which four time units that are identified as #0, #1, #2, and #3 are the at least one time unit, one time unit that is identified as #0 is the at least one first time subunit, and three time units that are identified as #1, #2, and #3 are the at least one second time subunit is used. If the control information indicates that the position of the at least one first time subunit is in the $1^{st}$ time unit of the four time units, it may be determined, based on the control information, that the at least one first time subunit is the time unit identified as #0, and the at least one second time subunit is the time units identified as #1, #2, and #3. Alternatively, if the control information indicates that the position of the at least one second time subunit is in the $2^{nd}$ time unit, the $3^{rd}$ time unit, and the $4^{th}$ time unit of the four time units, it may be determined, based on the control information, that the at least one second time subunit is the time units identified as #1, #2, and #3, and the at least one first time subunit is the time unit identified as #0.

In another optional implementation of the control information, the control information is used to indicate a position of the at least one first time subunit and a position of the at least one second time subunit. In part 310, the at least one first time subunit and the at least one second time subunit may be determined based on the position of the at least one first time subunit and the position of the at least one second time subunit that are indicated by the control information. The control information may indicate the position of the at least one first time subunit and the position of the at least one second time subunit, or may indicate an index, a number, or an enumeration parameter corresponding to the position.

For example, a time domain resource shown in FIG. 4 is used as an example. In FIG. 4, an example in which four time units that are identified as #0, #1, #2, and #3 are the at least one time unit, one time unit that is identified as #0 is the at least one first time subunit, and three time units that are identified as #1, #2, and #3 are the at least one second time subunit is used. If the control information indicates that the position of the at least one first time subunit is in the $1^{st}$ time unit of the four time units, and indicates that the position of the at least one second time subunit is in the $2^{nd}$ time unit, the $3^{rd}$ time unit, and the $4^{th}$ time unit of the four time units, it may be determined, based on the control information, that the at least one first time subunit is the time unit identified as #0, and the at least one second time subunit is the time units identified as #1, #2, and #3.

Figure 5:
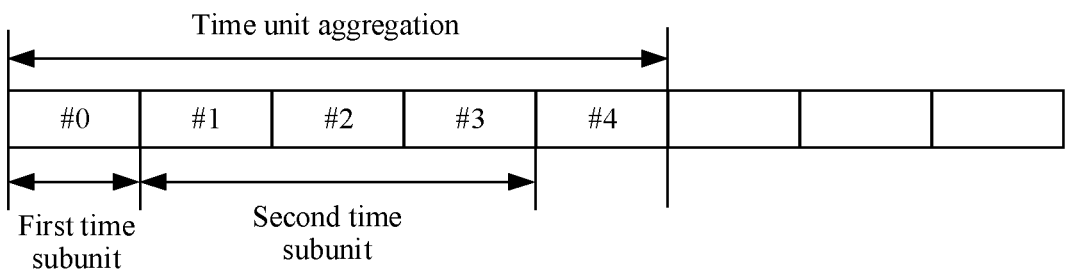
FIG. 5 is a schematic diagram of another time domain resource according to an embodiment of this application.

For another example, another time domain resource shown in FIG. 5 is used as an example. In FIG. 5, an example in which five time units that are identified as #0, #1, #2, #3, and #4 are the at least one time unit, one time unit that is identified as #0 is the at least one first time subunit, and three time units that are identified as #1, #2, and #3 are the at least one second time subunit is used. If the control information indicates that the position of the at least one first time subunit is in the $1^{st}$ time unit of the five time units, and indicates that the position of the at least one second time subunit is in the $2^{nd}$ time unit, the $3^{rd}$ time unit, and the $4^{th}$ time unit of the five time units, it may be determined, based on the control information, that the at least one first time subunit is the time unit identified as #0, and the at least one second time subunit is the time units identified as #1, #2, and #3.

In another optional implementation of the control information, the control information is used to indicate a quantity of the at least one first time subunit, or the control information is used to indicate a quantity of the at least one second time subunit. It may be understood that this implementation is applicable to a case in which the at least one time unit includes the at least one first time subunit and the at least one second time subunit. It may be understood that, in this implementation, a position relationship between the at least one first time subunit and the at least one second time subunit (for example, the at least one first time subunit is before the at least one second time subunit in time domain, or the at least one first time subunit is after the at least one second time subunit in time domain) may be predefined, or may be configured by a network device. In part 310, the at least one first time subunit may be determined based on the quantity that is of the at least one first time subunit and that is indicated by the control information and the position relationship between the at least one first time subunit and the at least one second time subunit. In addition, the at least one time unit includes the at least one first time subunit and the at least one second time subunit. Therefore, the at least one second time subunit may be determined in the at least one time unit. The control information may indicate the quantity of the at least one first time subunit or the quantity of the at least one second time subunit, or may indicate an index, a number, or an enumeration parameter corresponding to the quantity.

For example, a time domain resource shown in FIG. 4 is used as an example, and an example in which the at least one first time subunit is before the at least one second time subunit in time domain is used. If the control information indicates that the quantity of the at least one first time subunit is one, it may be determined, based on the control information, that the at least one first time subunit is a time unit identified as #0, and the at least one second time subunit is time units identified as #1, #2, and #3. Alternatively, if the control information indicates that the quantity of the at least one second time subunit is three, it may be determined, based on the control information, that the at least one second time subunit is time units identified as #1, #2, and #3, and the at least one first time subunit is a time unit identified as #0.

In another optional implementation of the control information, the control information is used to indicate a quantity of the at least one first time subunit and a quantity of the at least one second time subunit. It may be understood that, in this implementation, a position relationship between the at least one first time subunit and the at least one second time subunit (for example, the at least one first time subunit is before the at least one second time subunit in time domain, or the at least one first time subunit is after the at least one second time subunit in time domain) may be predefined, or may be configured by a network device. In part 310, the at least one first time subunit and the at least one second time subunit may be determined based on the quantity of the at least one first time subunit and the quantity of the at least one second time subunit that are indicated by the control information and the position relationship between the at least one first time subunit and the at least one second time subunit. The control information may indicate the quantity of the at least one first time subunit and the quantity of the at least one second time subunit, or may indicate an index, a number, or an enumeration parameter corresponding to the quantity.

For example, a time domain resource shown in FIG. 4 is used as an example, and an example in which the at least one first time subunit is before the at least one second time subunit in time domain is used. If the control information indicates that the quantity of the at least one first time subunit is one, and indicates that the quantity of the at least one second time subunit is three, and a sequence of the at least one first time subunit and the at least one second time subunit in time domain is predefined or configured, it may be determined, based on the control information, that the at least one first time subunit is a time unit identified as #0, and the at least one second time subunit is time units identified as #1, #2, and #3.

In another optional implementation of the control information, the control information is used to indicate a ratio of a quantity of the first time subunits to a quantity of the second time subunits, or the control information is used to indicate a ratio of a quantity of the second time subunits to a quantity of the first time subunits. It may be understood that, in this implementation, a position relationship between the at least one first time subunit and the at least one second time subunit (for example, the at least one first time subunit is before the at least one second time subunit in time domain, or the at least one first time subunit is after the at least one second time subunit in time domain) may be predefined, or may be configured by a network device. In part 310, the at least one first time subunit and the at least one second time subunit may be determined based on the ratio indicated by the control information. The control information may indicate the ratio of the quantity of the first time subunits to the quantity of the second time subunits (or the quantity of the second time subunits to the quantity of the first time subunits), or an index, a number, or an enumeration parameter corresponding to the ratio.

For example, a time domain resource shown in FIG. 4 is used as an example, and an example in which the at least one first time subunit is before the at least one second time subunit in time domain is used. If the control information indicates that the ratio of the quantity of the first time subunits to the quantity of the second time subunits is 1:3, or the control information indicates that the ratio of the quantity of the second time subunits to the quantity of the first time subunits is 3:1, and a sequence of the at least one first time subunit and the at least one second time subunit in time domain is predefined or configured, it may be determined, based on the control information, that the at least one first time subunit is a time unit identified as #0, and the at least one second time subunit is time units identified as #1, #2, and #3.

In another optional implementation of the control information, the control information may be carried by a physical downlink control channel (PDCCH), a physical sidelink control channel (PSCCH), a system message, radio resource control (RRC) signaling, or a media access control (MAC) control element (CE). Alternatively, the control information may be carried by a plurality of the foregoing items. For example, the control information may be carried by a PDCCH and a system message, or the control information may be carried by a PDCCH, RRC signaling, and the like.

For example, a candidate set is configured or predefined through a system message (or RRC signaling), and the candidate set includes a plurality of candidate positions, a plurality of candidate quantities, or a plurality of candidate ratios. Downlink control information (downlink control information, DCI) carried by a PDCCH indicates one of the plurality of candidate positions in the candidate set, DCI carried by a PDCCH indicates one of the plurality of candidate quantities in the candidate set, or DCI carried by a PDCCH indicates one of the plurality of candidate ratios in the candidate set. It may be understood that, the DCI may alternatively indicate an index, a number, or an enumeration parameter corresponding to one of the plurality of candidate positions in the candidate set, the DCI may indicate an index, a number, or an enumeration parameter corresponding to one of the plurality of candidate quantities in the candidate set, or the DCI may indicate an index, a number, or an enumeration parameter corresponding to one of the plurality of candidate ratios in the candidate set.

For example, with reference to FIG. 4, an example in which the control information is used to indicate the ratio of the quantity of the first time subunits to the quantity of the second time subunits, and the control information is carried by a PDCCH and a system message (or RRC signaling) is used. A candidate set is configured or predefined through the system message (or the RRC signaling), the candidate set includes three candidate ratios: {1:3, 2:2 (or 1:1), 3:1}, and DCI carried by the PDCCH indicates 1:3 in the candidate set. Alternatively, a candidate set is configured or predefined through the system message (or the RRC signaling), the candidate set includes three candidate ratios {1:3, 2:2 (or 1:1), 3:1} and corresponding indexes (as shown in Table 1), and DCI carried by the PDCCH indicates an index 0 corresponding to 1:3 in the candidate set.

TABLE 1

| Index | Ratio |
|---|---|
| 0 | 1:3 |
| 1 | 2:2 (or 1:1) |
| 2 | 3:1 |

In another optional implementation of the control information, the control information includes a bitmap used to indicate the at least one first time subunit and the at least one second time subunit. Optionally, a quantity of bits included in the bitmap is greater than or equal to a quantity of the at least one time unit. Optionally, a bit identified as 0 in the bitmap indicates the at least one first time subunit, and a bit identified as 1 in the bitmap indicates the at least one second time subunit. Alternatively, a bit identified as 1 in the bitmap indicates the at least one first time subunit, and a bit identified as 0 in the bitmap indicates the at least one second time subunit.

FIG. 4 is used as an example. The bitmap used to indicate the at least one first time subunit and the at least one second time subunit may include four bits "b0, b1, b2, and b3", which respectively correspond to the four time units "#0, #1, #2, and #3" shown in FIG. 4. The bitmap may be "0111", indicating that the at least one first time subunit includes the time unit #0, and the at least one second time subunit includes the time units #1, #2, and #3. Alternatively, the bitmap may be "1110", indicating that the at least one first time subunit includes the time unit #0, and the at least one second time subunit includes the time units #1, #2, and #3.

The time unit and the time subunit in the foregoing implementations may be one of the following several cases: The time unit is a slot, and the time subunit is a slot. Alternatively, the time unit is a subframe, and the time subunit is a subframe. Alternatively, the time unit is a frame, and the time subunit is a frame. In other words, the time unit and the time subunit may have a same time length.

It may be understood that the time unit and the time subunit may also have different time lengths, and a time length of the time subunit is less than a time length of the time unit. For example, the time unit is a slot, and the time subunit is a symbol (which may also be referred to as a time domain symbol). Alternatively, the time unit is a subframe, and the time subunit is a slot or a symbol. Alternatively, the time unit is a frame, and the time subunit is a subframe, a slot, or a symbol.

Figure 6A:
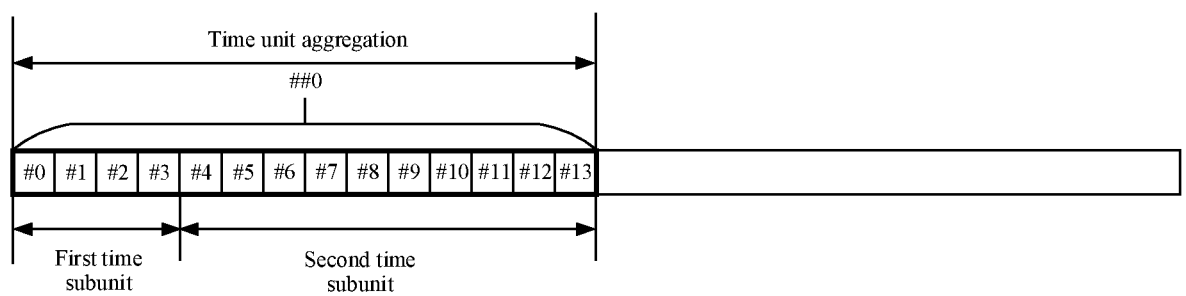
FIG. 6A is a schematic diagram of another time domain resource according to an embodiment of this application.

FIG. 6A is used as an example, and an example in which one slot includes 14 symbols is used. One slot identified as ##0 is the at least one time unit, four symbols identified as #0 to #3 are the at least one first time subunit, and 10 symbols identified as #4 to #13 are the at least one second time subunit. In this possible implementation, the time unit is a slot, and the time subunit is a symbol.

Figure 6B:
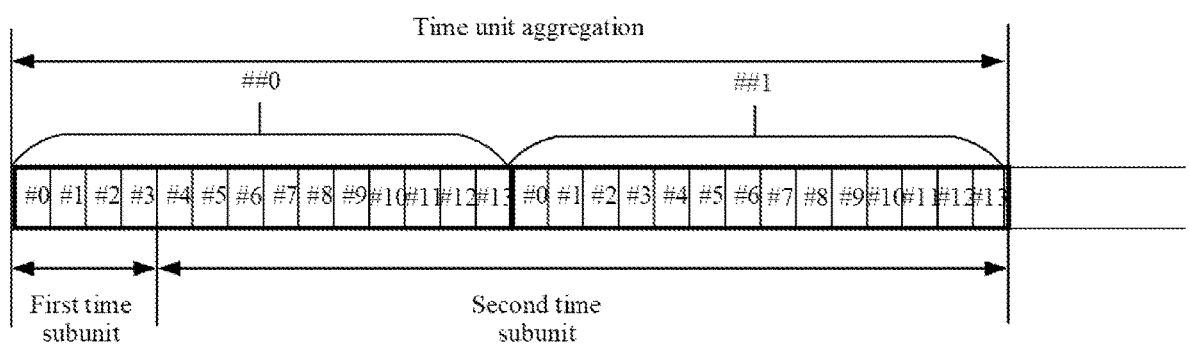
FIG. 6B is a schematic diagram of another time domain resource according to an embodiment of this application.

FIG. 6B is used as another example. Two slots identified as ##0 and ##1 are the at least one time unit, four symbols identified as #0 to #3 in the slot ##0 are the at least one first time subunit, and 10 symbols identified as #4 to #13 in the slot ##0 and fourteen symbols identified as #0 to #13 in the slot ##1 are the at least one second time subunit. In this possible implementation, the time unit is a slot, the time subunit is a symbol, and the at least one first time subunit (or the at least one second time subunit) may include time subunits in different time units.

The time unit and the time subunit in this embodiment of this application may have a same time length, or may have different time lengths, to support a more flexible service, so that use of a time domain resource better matches a service requirement, thereby improving resource use efficiency.

In a possible implementation of the at least one time unit, the at least one time unit is predefined or is configured by the communication device.

In a possible implementation in which the communication device configures the at least one time unit, in part 300, optionally, first configuration information from the communication device may be further received, where the first configuration information is used to configure the at least one time unit. Alternatively, in part 300, optionally, first configuration information from the communication device may be received, where the first configuration information is used to configure the at least one time unit, and a quantity of the at least one time unit is two or more than two. If the first configuration information from the communication device is not received, the quantity of the at least one time unit is one by default. The communication device may be a network device, or may be a terminal. In part 300, the communication device in "receiving the control information from the communication device" may be referred to as a first communication device, the communication device in "receiving the first configuration information from the communication device" may be referred to as a second communication device. The first communication device and the second communication device may be a same communication device, or may be different communication devices.

In an optional implementation of the first configuration information, the first configuration information is used to configure the quantity of the at least one time unit. FIG. 4 is used as an example, and the first configuration information configures the quantity of the at least one time unit to four. FIG. 5 is used as an example, and the first configuration information configures the quantity of the at least one time unit to five. FIG. 6A is used as an example, and the first configuration information configures the quantity of the at least one time unit to one. FIG. 6B is used as an example, and the first configuration information configures the quantity of the at least one time unit to two. It may be understood that the quantity of the at least one time unit may also be understood as a quantity of time units in a time unit aggregation.

In another optional implementation of the first configuration information, the first configuration information may be carried by a PDCCH, a PSCCH, a system message, RRC signaling, or a MAC CE. Alternatively, the first configuration information may be carried by a plurality of the foregoing items. For example, the first configuration information may be carried by a PDCCH and a system message, or the first configuration information may be carried by a PDCCH, RRC signaling, and the like.

For example, a candidate time unit set is configured or predefined through a system message (or RRC signaling), and the candidate time unit set includes a plurality of candidate quantities of the at least one time unit. DCI carried by a PDCCH indicates one of the plurality of candidate quantities of the at least one time unit in the candidate time unit set. It may be understood that the DCI may alternatively indicate an index, a number, or an enumeration parameter corresponding to one of the plurality of candidate quantities of the at least one time unit in the candidate time unit set.

FIG. 4 is used as an example. A candidate time unit set is configured or predefined through a system message (or RRC signaling), the candidate time unit set includes three candidate quantities of the at least one time unit: {2, 4, 8}, and DCI carried by a PDCCH indicates 4 in the candidate time unit set. Alternatively, a candidate time unit set is configured or predefined through a system message (or RRC signaling), the candidate unit set includes three candidate quantities {2, 4, 8} of the at least one time unit and corresponding indexes (as shown in Table 2), and DCI carried by a PDCCH indicates an index 1 corresponding to 4 in the candidate time unit set. Alternatively, a candidate time unit set is configured or predefined through a system message (or RRC signaling), the candidate unit set includes three candidate quantities {2, 4, 8} of the at least one time unit and corresponding enumeration parameters (as shown in Table 3), and DCI carried by a PDCCH indicates an enumeration parameter n4 corresponding to 4 in the candidate time unit set.

TABLE 2

| Index | Quantity |
|-------|----------|
| 0 | 2 |
| 1 | 4 |
| 2 | 8 |

TABLE 3

| Enumeration parameter | Quantity |
|-----------------------|----------|
| n2 | 2 |
| n4 | 4 |
| n8 | 8 |

In an optional implementation of part 320, the first data is data corresponding to a first TB, and the second data is data corresponding to a second transport block TB. It may be understood that the TB in this embodiment of this application includes a plurality of data bits, data corresponding to a TB may be understood as data obtained after the data bits included in the TB are preprocessed, and the preprocessing includes one or more of encoding, modulation, layer mapping, antenna port mapping, or precoding. FIG. 4 is used as an example. At least one first time subunit #0 is used to carry the data corresponding to the first TB, and at least one second time subunit #1 to #3 is used to carry the data corresponding to the second TB. The data corresponding to the first TB may be less than the data corresponding to the second TB. Correspondingly, the data corresponding to the first TB is received in the at least one first time subunit #0, and the data corresponding to the second TB is received in the at least one second time subunit #1 to #3. A time domain resource occupied for data receiving and sending may be flexibly adjusted based on amounts of data corresponding to different TBs. Therefore, data transmission efficiency and resource use efficiency can be improved.

In another optional implementation of part 320, the first data is data corresponding to a first hybrid automatic repeat request (hybrid automatic repeat request, HARQ) process, and the second data is data corresponding to a second HARQ process. In this embodiment of this application, the data corresponding to a HARQ may be understood as data corresponding to a HARQ process identifier. To be specific, the first data is data identified by using a first HARQ process identifier, and the second data is data identified by using a second HARQ process identifier. FIG. 4 is used as an example. At least one first time subunit #0 is used to carry the data corresponding to the first HARQ process, and at least one second time subunit #1 to #3 is used to carry the data corresponding to the second HARQ process. The data corresponding to the first HARQ process may be less than the data corresponding to the second HARQ process. Correspondingly, the data corresponding to the first HARQ process is received in the at least one first time subunit #0, and the data corresponding to the second HARQ process is received in the at least one second time subunit #1 to #3. A time domain resource occupied for data receiving and sending may be flexibly adjusted based on amounts of data corresponding to different HARQ processes. Therefore, data transmission efficiency and resource use efficiency can be improved.

In another optional implementation of part 320, the first data is initially transmitted data, and the second data is retransmitted data. One HARQ process corresponds to one new data indicator (new data indicator, NDI) value, and one bit is used for the value to indicate whether transmitted data is initially transmitted data or retransmitted data. If an NDI value of a HARQ process changes, for example, the NDI value changes from 1 to 0, it represents that initially transmitted data is transmitted; otherwise, it represents that retransmitted data is transmitted. Alternatively, for data corresponding to a HARQ process, if there is no previous NDI, it may be considered that initially transmitted data is currently transmitted. If retransmitted data is transmitted, received data may be combined with previously received data stored in a HARQ buffer of the same HARQ process. If initially transmitted data is transmitted, a HARQ buffer of the HARQ process is cleared. FIG. 4 is used as an example. At least one first time subunit #0 is used to carry the initially transmitted data, and at least one second time subunit #1 to #3 is used to carry the retransmitted data. The initially transmitted data may be less than the retransmitted data. Correspondingly, the initially transmitted data is received in the at least one first time subunit #0, and the retransmitted data is received in the at least one second time subunit #1 to #3. A time domain resource occupied for data receiving and sending may be flexibly adjusted based on amounts of the initially transmitted data and the retransmitted data. Therefore, data transmission efficiency and resource use efficiency can be improved.

In another optional implementation of part 320, the first data is retransmitted data, and the second data is initially transmitted data. FIG. 4 is used as an example. At least one first time subunit #0 is used to carry the retransmitted data, and at least one second time subunit #1 to #3 is used to carry the initially transmitted data. The retransmitted data may be less than the initially transmitted data. Correspondingly, the retransmitted data is received in the at least one first time subunit #0, and the initially transmitted data is received in the at least one second time subunit #1 to #3. A time domain resource occupied for data receiving and sending may be flexibly adjusted based on amounts of the initially transmitted data and the retransmitted data. Therefore, data transmission efficiency and resource use efficiency can be improved.

In another optional implementation of part 320, the first data is first initially transmitted data, and the second data is second initially transmitted data. FIG. 4 is used as an example. At least one first time subunit #0 is used to carry the first initially transmitted data, and at least one second time subunit #1 to #3 is used to carry the second initially transmitted data. The first initially transmitted data may be less than the second initially transmitted data. Correspondingly, the first initially transmitted data is received in the at least one first time subunit #0, and the second initially transmitted data is received in the at least one second time subunit #1 to #3. A time domain resource occupied for data receiving and sending may be flexibly adjusted based on data amounts of different initially transmitted data. Therefore, transmission efficiency of the initially transmitted data and resource use efficiency can be improved.

In another optional implementation of part 320, the first data is first retransmitted data, and the second data is second retransmitted data. FIG. 4 is used as an example. At least one first time subunit #0 is used to carry the first retransmitted data, and at least one second time subunit #1 to #3 is used to carry the second retransmitted data. The first retransmitted data may be less than the second retransmitted data. Correspondingly, the first retransmitted data is received in the at least one first time subunit #0, and the second retransmitted data is received in the at least one second time subunit #1 to #3. A time domain resource occupied for data receiving and sending may be flexibly adjusted based on data amounts of different retransmitted data. Therefore, transmission efficiency of the retransmitted data and resource use efficiency can be improved.

In another optional implementation of part 320, the first data is data corresponding to a first redundancy version (RV), and the second data is data corresponding to a second RV. In this embodiment of this application, the RV may be understood as a redundancy version used to indicate data transmission, and a value range of the RV may be 0 to 3. FIG. 4 is used as an example. At least one first time subunit #0 is used to carry the data corresponding to the first RV, and at least one second time subunit #1 to #3 is used to carry the data corresponding to the second RV. The data corresponding to the first RV may be less than the data corresponding to the second RV. Correspondingly, the data corresponding to the first RV is received in the at least one first time subunit #0, and the data corresponding to the second RV is received in the at least one second time subunit #1 to #3. A time domain resource occupied for data receiving and sending may be flexibly adjusted based on amounts of data corresponding to different RVs. Therefore, data transmission efficiency and resource use efficiency can be improved. The first RV and the second RV may be implemented in a plurality of different manners. For example, the first RV and the second RV may be different RVs of one TB. For another example, the first RV and the second RV may be different RVs and respectively correspond to two TBs. For still another example, the first RV and the second RV may be a same RV and respectively correspond to two TBs.

In another optional implementation of part 320, the first data is data corresponding to a first service, and the second data is data corresponding to a second service. FIG. 4 is used as an example. At least one first time subunit #0 is used to carry the data corresponding to the first service, and at least one second time subunit #1 to #3 is used to carry the data corresponding to the second service. The data corresponding to the first service may be less than the data corresponding to the second service. Correspondingly, the data corresponding to the first service is received in the at least one first time subunit #0, and the data corresponding to the second service is received in the at least one second time subunit #1 to #3. A time domain resource occupied for data receiving and sending may be flexibly adjusted based on amounts of data corresponding to different services. Therefore, data transmission efficiency and resource use efficiency can be improved. Optionally, the first service and the second service may be an enhanced mobile broadband (eMBB) service, an ultra-reliable low-latency communication (URLLC) service, an augmented reality (Augmented Reality, AR)/virtual reality (VR) service, or a massive machine-type communications (mMTC) service.

In still another possible implementation of part 320, the first data may alternatively be received in the at least one first time subunit based on the control information, and the second data may alternatively be received in the at least one second time subunit based on the control information. The control information includes scheduling information of the first data and scheduling information of the second data, and the scheduling information includes one or more pieces of information such as resource allocation information and a modulation and coding scheme (MCS). After the control information from the communication device is received and the scheduling information is obtained, the first data may be received in the at least one first time subunit based on the scheduling information, and the second data may be received in the at least one second time subunit based on the scheduling information. In this implementation, signaling overheads for data scheduling can be reduced.

Figure 7:
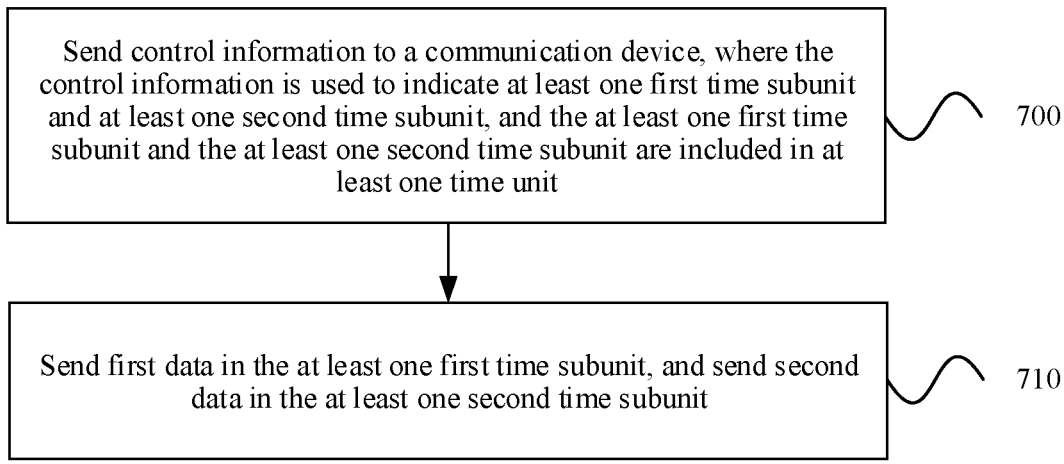
FIG. 7 is a schematic flowchart of another communication method according to an embodiment of this application.

FIG. 7 is a schematic flowchart of another communication method according to an embodiment of this application. The method may be performed by a network device or a terminal. As shown in FIG. 7, the method in this embodiment may include the following parts.

Part 700: Send control information to a communication device, where the control information is used to indicate at least one first time subunit and at least one second time subunit, and the at least one first time subunit and the at least one second time subunit are included in at least one time unit. The communication device may be a terminal.

Part 710: Send first data in the at least one first time subunit, and send second data in the at least one second time subunit.

In a possible implementation of the at least one time unit, the at least one time unit is predefined.

In another possible implementation of the at least one time unit, in part 700, optionally, first configuration information may be further sent to the communication device, where the first configuration information is used to configure the at least one time unit. Alternatively, in part 700, optionally, first configuration information may be further sent to the communication device, where the first configuration information is used to configure the at least one time unit, and a quantity of the at least one time unit is two or more. If the first configuration information is not sent, the quantity of the at least one time unit is one by default.

According to the method described in the foregoing embodiment, the terminal or the network device can determine different time domain resources for sending different data in the at least one time unit. Therefore, a time domain resource occupied for data receiving and sending can be flexibly adjusted based on an actual requirement for data transmission, thereby improving data transmission efficiency.

For descriptions of the time unit, the time subunit, the first time subunit, the second time subunit, the control information, the first configuration information, the first data, and the second data in the communication method shown in FIG. 7, refer to the descriptions of the time unit, the time subunit, the first time subunit, the second time subunit, the control information, the first configuration information, the first data, and the second data in the communication method shown in FIG. 3. Details are not described herein again.

Figure 8:
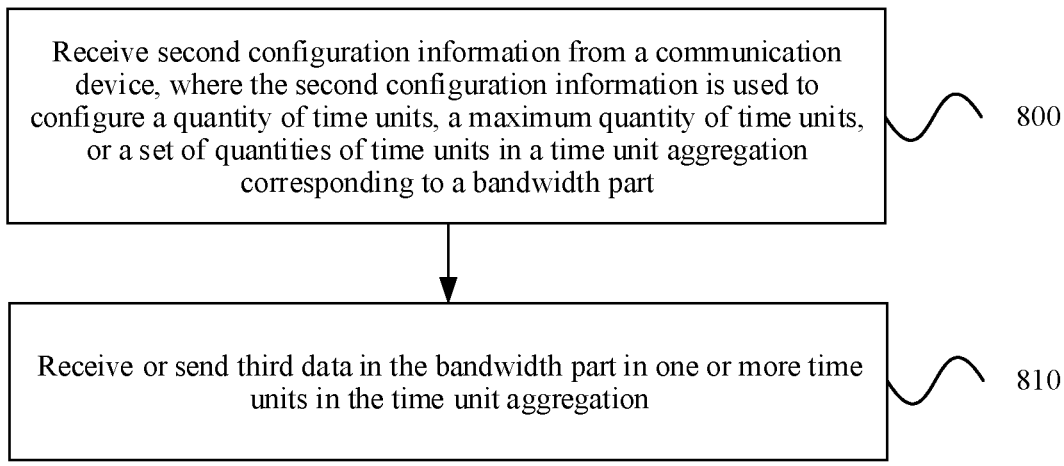
FIG. 8 is a schematic flowchart of another communication method according to an embodiment of this application.

FIG. 8 is a schematic flowchart of another communication method according to an embodiment of this application. The method may be performed by a terminal. As shown in FIG. 8, the method in this embodiment may include the following parts.

Part 800: Receive second configuration information from a communication device, where the second configuration information is used to configure a quantity of time units, a maximum quantity of time units, or a set of quantities of time units in a time unit aggregation corresponding to a bandwidth part (BWP). The communication device may be a network device, or may be a terminal.

The BWP may be understood as a physical resource. The BWP may include at least one resource block group (RBG), at least one physical resource block group (PRG), at least one resource block (RB), or at least one subcarrier (SC) in frequency domain. The RBG, the PRG, the RB, and the SC may also be understood as physical resources in frequency domain.

For descriptions of the time unit and the time unit aggregation in this embodiment of this application, refer to the descriptions of the time unit and the time unit aggregation in the communication method shown in FIG. 3. Details are not described herein again.

Part 810: Receive or send third data in the BWP in one or more time units in the time unit aggregation.

In this embodiment of this application and another embodiment of this application, the time unit aggregation corresponding to the BWP may also be understood as a time unit aggregation used in the BWP, a time unit aggregation that can be used in the BWP, a candidate time unit aggregation used in the BWP, or the like.

According to the method provided in this embodiment, the quantity of time units included in the time unit aggregation corresponding to the BWP is restricted, so that transmission is not limited by a predefined transport block size and a predefined maximum transport block size is not increased when transmission is performed in a plurality of time units, thereby reducing system design complexity.

In an optional implementation of the second configuration information, the second configuration information is used to configure a quantity A1 of time units in the time unit aggregation corresponding to the BWP. In this case, a quantity of one or more time units in the time unit aggregation in part 810 may be equal to A1 or less than A1. It may be understood that the quantity A1 of time units in the time unit aggregation corresponding to the BWP may also be understood as a maximum quantity of time units in the time unit aggregation corresponding to the BWP.

In another optional implementation of the second configuration information, the second configuration information is used to configure a set {A1, A2, . . . , An} of quantities of time units in the time unit aggregation corresponding to the BWP, where n is an integer greater than 1. In this case, a quantity of one or more time units in the time unit aggregation in part 810 may be one of elements in the foregoing set.

In another optional implementation of the second configuration information, the second configuration information may be carried by a PDCCH, a PSCCH, a system message, RRC signaling, or a MAC CE. Alternatively, the second configuration information may be carried by a plurality of the foregoing items. For example, the first configuration information may be carried by a PDCCH and a system message, or the first configuration information may be carried by a PDCCH, RRC signaling, and the like.

It may be understood that the communication method shown in FIG. 8 may be separately implemented, or may be implemented in combination with the communication method shown in FIG. 3.

When the communication methods shown in FIG. 8 and FIG. 3 are combined for implementation, the second configuration information and the first configuration information may be same information, or may be different information. Part 800 may be performed before part 310, and an execution sequence of part 800 and part 300 may not be limited.

When the communication methods shown in FIG. 8 and FIG. 3 are combined for implementation, the one or more time units in the time unit aggregation in part 810 may include the at least one first time subunit in part 320, the third data may be the first data in part 320, and part 810 may be understood as receiving the third data (the first data) in the BWP in the one or more time units (the at least one first time subunit) in the time unit aggregation. Alternatively, the one or more time units in the time unit aggregation in part 810 may include the at least one second time subunit in part 320, the third data may be the second data in part 320, and part 810 may be understood as receiving the third data (the second data) in the BWP in the one or more time units (the at least one second time subunit) in the time unit aggregation.

Figure 9:
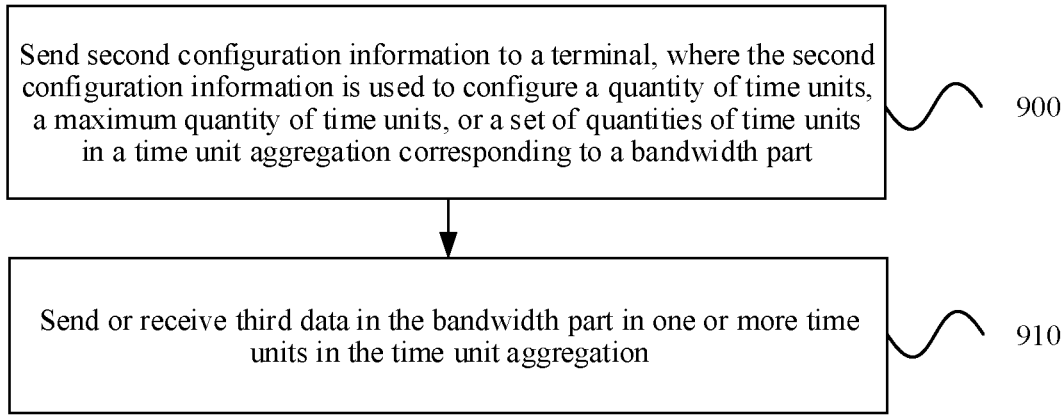
FIG. 9 is a schematic flowchart of another communication method according to an embodiment of this application.

FIG. 9 is a schematic flowchart of another communication method according to an embodiment of this application. The method may be performed by a network device or a terminal. As shown in FIG. 9, the method in this embodiment may include the following parts.

Part 900: Send second configuration information to a terminal, where the second configuration information is used to configure a quantity of time units, a maximum quantity of time units, or a set of quantities of time units in a time unit aggregation corresponding to a bandwidth part.

Part 910: Send or receive third data in the bandwidth part in one or more time units in the time unit aggregation.

For descriptions of the BWP and the second configuration information in this embodiment of this application, refer to the descriptions of the BWP in the communication method shown in FIG. 8. For descriptions of the time unit and the time unit aggregation in this embodiment of this application, refer to the descriptions of the time unit and the time unit aggregation in the communication method shown in FIG. 3. Details are not described herein again.

According to the method provided in this embodiment, the quantity of time units included in the time unit aggregation corresponding to the BWP is restricted, so that when transmission is performed in a plurality of time units, transmission is not limited by a predefined transport block size, and a predefined maximum transport block size is not increased, thereby reducing system design complexity.

It may be understood that the communication method shown in FIG. 9 may be separately implemented, or may be implemented in combination with the communication method shown in FIG. 7.

When the communication methods shown in FIG. 9 and FIG. 7 are combined for implementation, the second configuration information and the first configuration information may be same information, or may be different information. Part 900 may be performed before part 710, and an execution sequence of part 900 and part 700 may not be limited.

When the communication methods shown in FIG. 9 and FIG. 7 are combined for implementation, the one or more time units in the time unit aggregation in part 910 may include the at least one first time subunit in part 710, the third data may be the first data in part 710, and part 910 may be understood as sending the third data (the first data) in the BWP in the one or more time units (the at least one first time subunit) in the time unit aggregation. Alternatively, the one or more time units in the time unit aggregation in part 910 may include the at least one second time subunit in part 710, the third data may be the second data in part 710, and part 910 may be understood as receiving the third data (the second data) in the BWP in the one or more time units (the at least one second time subunit) in the time unit aggregation.

Figure 10:
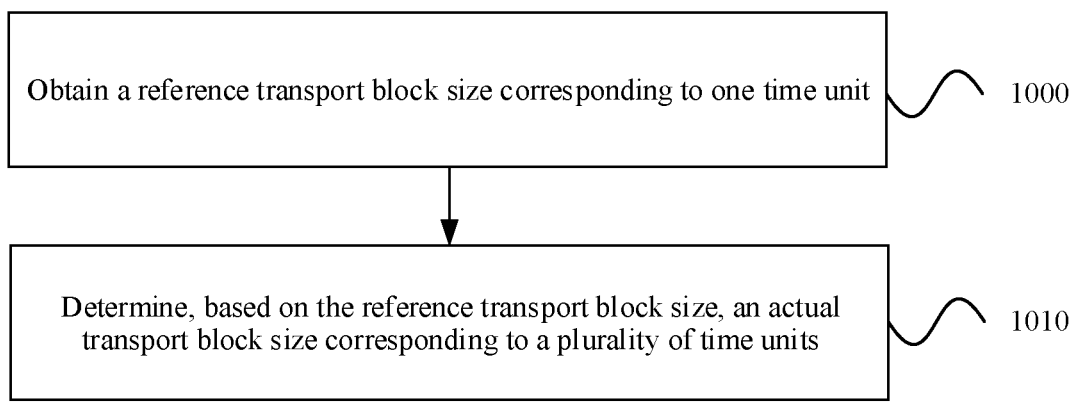
FIG. 10 is a schematic flowchart of another communication method according to an embodiment of this application.

FIG. 10 is a schematic flowchart of another communication method according to an embodiment of this application. The method may be performed by a network device or a terminal. As shown in FIG. 10, the method in this embodiment may include the following parts.

Part 1000: Obtain a reference transport block size corresponding to a reference time unit.

Part 1010: Determine, based on the reference transport block size, an actual transport block size corresponding to a plurality of time units (M time units, where M is an integer greater than 1). Optionally, the plurality of time units are included in a time unit aggregation, or the plurality of time units constitute a time unit aggregation. The time unit aggregation may also be understood as a set of time units.

The reference time unit in this embodiment of this application is predefined, or is configured through higher layer signaling (for example, a system message or RRC signaling), or is indicated by DCI carried by a PDCCH. For example, the reference time unit may be the $1^{st}$ time unit or the last time unit in the M time units.

For descriptions of the time unit and the time unit aggregation in this embodiment of this application, refer to the descriptions of the time unit and the time unit aggregation in the communication method shown in FIG. 3. Details are not described herein again.

According to the method provided in this embodiment, when transmission is performed in a plurality of time units, a transport block size used for transmission in the plurality of time units can be accurately and conveniently obtained, thereby reducing implementation complexity of a network device or a terminal.

In a possible implementation of the communication method shown in FIG. 10, in part 1000, it is obtained that the reference transport block size corresponding to the reference time unit is N (where N is an integer greater than 0). The determining the actual transport block size corresponding to the M time units based on the reference transport block size N in part 1010 includes that the actual transport block size N' corresponding to the M time units satisfies one of the following:

N'=N*M, N'=N*M*C1, N'=f(N*M*C1), N'=N*M/C2, or N'=f(N*M/C2), where C1 and C2 are positive real numbers, and f(x) represents rounding x.

In a possible implementation in which it is obtained that the reference transport block size corresponding to the reference time unit is N, the reference transport block size N corresponding to the reference time unit is obtained based on a quantity of symbols scheduled in the reference time unit. For example, the quantity of symbols scheduled in the reference time unit is $N_{symb}^{sh}$, a temporary quantity $N_{info}$ of bits may be obtained according to $N_{symb}^{sh}$, where $N_{info}$ satisfies $N_{info} = N_{RE} \cdot R \cdot Q_m \cdot v$, and $N_{RE} = N_{sc}^{RB} * N_{symb}^{sh} - N_{DMRS}^{PRB} - N_{oh}^{PRB}$. $Q_m$ represents a modulation order, R represents a code rate, v represents a quantity of data streams, $N_{sc}^{RB}$ is a quantity (for example, $N_{sc}^{RB}=12$) of subcarriers included in one RB, $N_{DMRS}^{PRB}$ is a quantity of resource elements (resource element, RE) occupied by a DMRS in the reference time unit, and $N_{oh}^{PRB}$ is a quantity of REs included in other overheads (for example, overheads configured through higher layer signaling). The RE in this embodiment of this application may be understood as a physical resource (where for example, one RE may occupy one subcarrier in frequency domain, and may occupy one symbol in time domain). It is determined, based on a value of $N_{info}$, whether to obtain the reference transport block size based on table lookup or based on calculation according to a formula. For example, the reference transport block size is obtained based on table lookup when $N_{info} \leq 3824$. $N_{info}$ is first quantized to obtain $N'_{info}$, where $N'_{info}$ satisfies $$N'_{info} = \max\left(24, 2^n \times \left\lfloor \frac{N_{info}}{2^n} \right\rfloor\right),$$

and n=max (3, $\lfloor \log_2(N_{info}) \rfloor - 6$), where max(x, y) represents that a larger value in x and y is used, and $\lfloor x \rfloor$ represents rounding x. Then, a value that is closest to and not greater than $N'_{info}$ is found from a plurality of predefined transport block sizes and is used as the reference transport block size N. For another example, the reference transport block size is obtained according to a formula when $N_{info} > 3824$. $N_{info}$ is first quantized to obtain $N'_{info}$, where $N'_{info}$ satisfies $$N'_{info} = \max\left(3840, 2^n \times \left(\frac{N_{info} - 24}{2^n}\right)\right),$$

and n=$\lfloor \log_2(N_{info}-24) \rfloor - 5$), where round(x) represents rounding x. Then, the reference transport block size N is obtained by using the following method:

If $R \leq \frac{1}{4}$, $$N = 8 \times C \times \left\lceil \frac{N'_{info} + 24}{8 \times C} - 24 \right\rceil, \text{ where } C = \left\lceil \frac{N'_{info} + 24}{3816} \right\rceil,$$

and $\lceil x \rceil$ represents rounding x.

If $R > \frac{1}{4}$ and $$N'_{info} > 8424, N = 8 \times C \times \left\lceil \frac{N'_{info} + 24}{8 \times C} - 24 \right\rceil,$$

where $C = \left\lceil \frac{N'_{info} + 24}{8424} \right\rceil.$

If $R > \frac{1}{4}$ and $$N'_{info} \leq 8484, N = 8 \times \left\lceil \frac{N'_{info} + 24}{8} - 24 \right\rceil.$$

In another possible implementation of the communication method shown in FIG. 10, the reference time unit includes a first reference time unit and a second reference time unit. In part 1000, it is obtained that a reference transport block size corresponding to the first reference time unit is J (where J is an integer greater than 0), and it is obtained that a reference transport block size corresponding to the second reference time unit is K (where K is an integer greater than 0). The first reference time unit may be understood as a reference time unit in which first information and/or a first signal are/is carried, and the second reference time unit may be understood as a reference time unit in which the first information and/or the first signal are/is not carried. In part 1010, determining the actual transport block size corresponding to the M time units based on the reference transport block sizes J and K includes that the actual transport block size N' corresponding to the M time units satisfies one of the following:

N'=J*L+K*(M−L), N'=J*L*C3+K*(M−L)*C4, or N'=f(J*L*C3+K*(M−L)*C4), where L is a quantity of time units in which the first information and/or the first signal are/is carried in the M time units, C3 and C4 are positive real numbers, and f(x) represents rounding x.

In a possible implementation in which it is obtained that the reference transport block size corresponding to the first reference time unit is J, the reference transport block size N corresponding to the reference time unit is obtained based on a quantity of symbols scheduled in the first reference time unit. For details, refer to the descriptions in the foregoing implementation in which it is obtained that the reference transport block size corresponding to the reference time unit is N. Details are not described herein again.

In a possible implementation in which it is obtained that the reference transport block size corresponding to the second reference time unit is K, the reference transport block size N corresponding to the reference time unit is obtained based on a quantity of symbols scheduled in the second reference time unit. For details, refer to the descriptions in the foregoing implementation in which it is obtained that the reference transport block size corresponding to the reference time unit is N. Details are not described herein again.

It may be understood that the first information and/or the first signal may include one or more of the following: control information, a reference signal, a synchronization signal (SS), a synchronization signal block (SSB), or a random access signal. The control information includes uplink control information (UCI) and/or downlink control information (DCI) that are/is carried by a control channel. The reference signal includes one or more of a demodulation reference signal (DMRS), a phase tracking reference signal (PTRS), a sounding reference signal (SRS), or a channel state information reference signal (CSI-RS). The synchronization signal includes a primary synchronization signal (PSS) and/or a secondary synchronization signal (SSS). The synchronization signal block includes a synchronization signal and/or a physical broadcast channel (PBCH).

According to the foregoing implementation, when the time unit aggregation includes both a time unit in which the first information and/or the first signal are/is carried and a time unit in which the first information and/or the first signal are/is not carried, a required transport block size can be more accurately calculated, thereby improving time resource utilization.

It may be understood that the communication method shown in FIG. 10 may be separately implemented, or may be implemented in combination with the communication method shown in FIG. 3, FIG. 7, FIG. 8, or FIG. 9.

When the communication methods shown in FIG. 10 and FIG. 3 are combined for implementation, the method shown in FIG. 10 may be performed after part 310 and before part 320. The plurality of time units (the M time units) in part 1010 may include the at least one first time subunit and/or the at least one second time subunit in part 320.

When the communication methods shown in FIG. 10 and FIG. 7 are combined for implementation, the method shown in FIG. 10 may be performed after part 700 and before part 710. The plurality of time units (the M time units) in part 1010 may include the at least one first time subunit and/or the at least one second time subunit in part 710.

When the communication methods shown in FIG. 10 and FIG. 8 are combined for implementation, the method shown in FIG. 10 may be performed after part 800 and before part 810. The plurality of time units (the M time units) in part 1010 may include the one or more time units in part 810.

When the communication methods shown in FIG. 10 and FIG. 9 are combined for implementation, the method shown in FIG. 10 may be performed after part 900 and before part 910. The plurality of time units (the M time units) in part 1010 may include the one or more time units in part 910.

Figure 11:
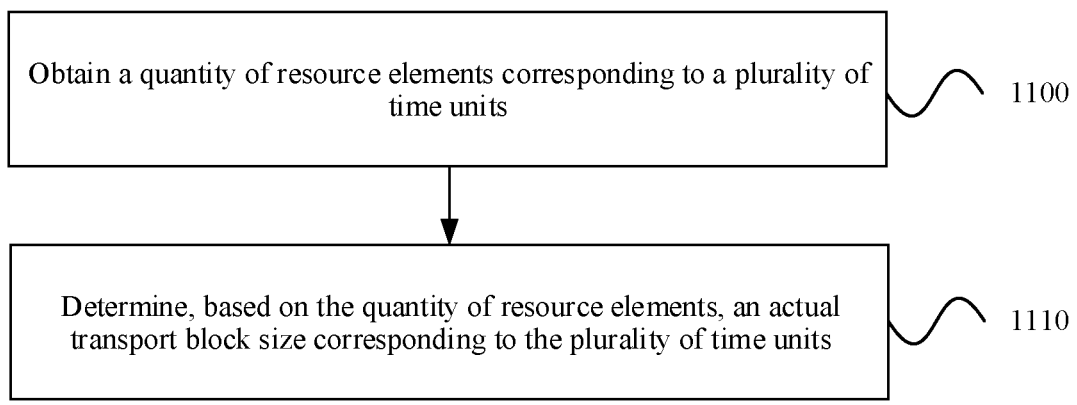
FIG. 11 is a schematic flowchart of another communication method according to an embodiment of this application.

FIG. 11 is a schematic flowchart of another communication method according to an embodiment of this application. The method may be performed by a network device or a terminal. As shown in FIG. 11, the method in this embodiment may include the following parts.

Part 1100: Obtain a quantity of REs corresponding to a plurality of time units. Optionally, the plurality of time units are included in a time unit aggregation, or the plurality of time units constitute a time unit aggregation. The time unit aggregation may also be understood as a set of time units.

Part 1110: Determine, based on the quantity of REs, an actual transport block size corresponding to the plurality of time units.

The RE in this embodiment of this application may be understood as a physical resource. Optionally, one RE may occupy one subcarrier in frequency domain, and may occupy one symbol in time domain.

For descriptions of the time unit and the time unit aggregation in this embodiment of this application, refer to the descriptions of the time unit and the time unit aggregation in the communication method shown in FIG. 3. Details are not described herein again.

According to the method provided in this embodiment, when transmission is performed in a plurality of time units, a transport block size used for transmission in the plurality of time units can be accurately and conveniently obtained, thereby reducing implementation complexity of a network device or a terminal.

In a possible implementation of part 1100, the time unit is a slot. It is obtained that a quantity of REs corresponding to a plurality of slots is $N_{RE}$, and satisfies $N_{RE}=N_{sc}^{RB}*N_{symb}^{sh}-N_{DMRS}^{PRB}-N_{oh}^{PRB}$, where $N_{sc}^{RB}$ is a quantity of subcarriers (where for example, $N_{sc}^{RB}=12$) included in one RB, $N_{symb}^{sh}$ is a quantity of symbols scheduled in the plurality of slots, $N_{DMRS}^{PRB}$ is a quantity of REs occupied by a DMRS in the plurality of slots, and $N_{oh}^{PRB}$ is a quantity of REs included in other overheads (for example, overheads configured through higher layer signaling).

In a possible implementation of part 1110, the actual transport block size corresponding to the plurality of time units is determined based on the quantity of REs. For details, refer to the descriptions in the foregoing implementation in which it is obtained that the reference transport block size corresponding to the reference time unit is N. Details are not described herein again.

It may be understood that the communication method shown in FIG. 11 may be separately implemented, or may be implemented in combination with the communication method shown in FIG. 3, FIG. 7, FIG. 8, or FIG. 9.

The correspondences shown in the foregoing tables may be configured, or may be predefined. Values of the information in the tables are merely examples, and other values may be configured. This is not limited in this application. When a correspondence between information and each parameter is configured, not all correspondences shown in the tables need to be configured. For example, in the foregoing tables, correspondences shown in some rows may not be configured. For another example, appropriate transformation and adjustments such as splitting and combination may be performed based on the foregoing tables. Names of the parameters shown in titles of the foregoing tables may alternatively be other names that can be understood by a communication device, and values or representation manners of the parameters may alternatively be other values or representation manners that can be understood by the communication device. During implementation of the foregoing tables, another data structure, such as an array, a queue, a container, a stack, a linear table, a pointer, a linked list, a tree, a graph, a structure, a class, a pile, or a hash table, may be used.

"Predefine" in this application may be understood as "define", "predefine", "define in a protocol", "store", "pre-store", "pre-negotiate", "preconfigure", "solidify", or "pre-burn".

The description in this application that a and b satisfy a relationship (which may also be understood as a functional relationship) does not forcibly require that a and b precisely satisfy the relationship. For example, if a value a' and the value b precisely satisfy the relationship, a value a obtained after an operation of floating-point removal, rounding, or rounding off is performed on the value a' may also be understood as that a and b satisfy the relationship. It may be understood that, that a and b satisfy a relationship may alternatively be that a and b satisfy a relationship obtained after equivalent transformation is performed on the relationship. This is not limited in the embodiments of this application. In addition, it may be understood that a specific implementation in which a and b satisfy a relationship is not limited in the embodiments of this application. For example, the mapping manner may be implemented by using a formula, or the mapping manner may be implemented in a form of a table, or the mapping manner may be implemented in another manner. This is not limited in the embodiments of this application.

It may be understood that the methods implemented by the communication device in the foregoing method embodiments may alternatively be implemented by a component (for example, an integrated circuit or a chip) that can be used in the communication device.

In correspondence to the wireless communication methods provided in the foregoing method embodiments, an embodiment of this application further provides a corresponding communication apparatus (which may also be referred to as a communication device). The communication apparatus includes a corresponding module configured to perform each part in the foregoing embodiments. The module may be software, hardware, or a combination of software and hardware.

Figure 12:
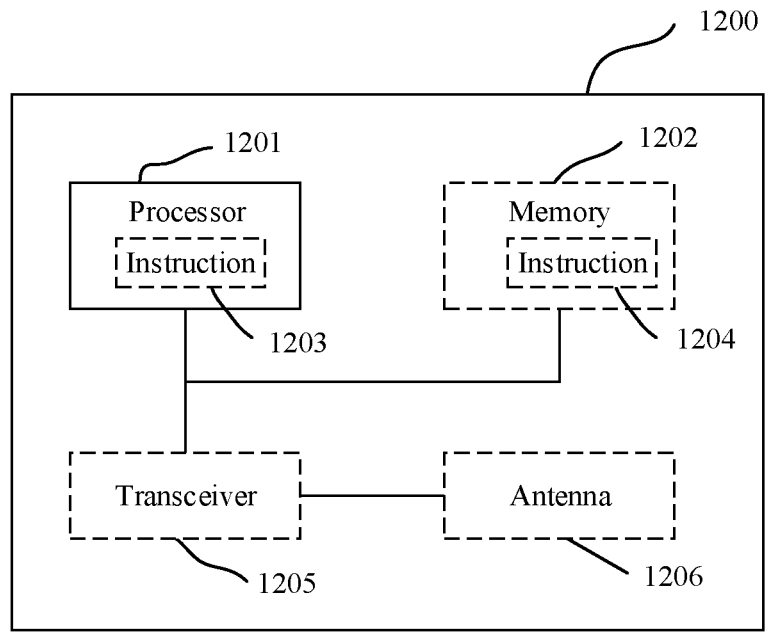
FIG. 12 is a schematic structural diagram of a communication apparatus according to an embodiment of this application.

FIG. 12 is a schematic structural diagram of a communication apparatus. The communication apparatus 1200 may be the network device 10 or 20 in FIG. 1, or may be the terminal 11, 12, 21, or 22 in FIG. 1. The communication apparatus 1200 may be configured to implement the method that corresponds to the terminal or the network device and that is described in the foregoing method embodiments. For details, refer to the descriptions in the foregoing method embodiments. The communication apparatus 1200 may be configured to implement the method described in FIG. 3, FIG. 7, FIG. 8, FIG. 9, FIG. 10, or FIG. 11.

The communication apparatus 1200 may include one or more processors 1201. The processor 1201 may also be referred to as a processing unit, and can implement a specific control function. The processor 1201 may be a general-purpose processor, a dedicated processor, or the like. For example, the processor 1201 may be a baseband processor or a central processing unit. The baseband processor may be configured to process a communication protocol and communication data. The central processing unit may be configured to: control the communication apparatus (for example, a base station, a baseband chip, a DU, or a CU), execute a software program, and process data of the software program.

In an optional design, the processor 1201 may further store an instruction and/or data 1203. The instruction and/or data 1203 may be run by the processor, to enable the communication apparatus 1200 to perform the method that corresponds to the terminal or the network device and that is described in the foregoing method embodiments.

In another optional design, the processor 1201 may include a transceiver unit configured to implement receiving and sending functions. For example, the transceiver unit may be a transceiver circuit or an interface. A circuit or an interface configured to implement the receiving function and a circuit or an interface configured to implement the sending function may be separated or may be integrated together.

In another possible design, the communication apparatus 1200 may include a circuit, and the circuit may implement the sending, receiving, or communication function in the foregoing method embodiments.

Optionally, the communication apparatus 1200 may include one or more memories 1202. The memory may store an instruction 1204, and the instruction may be run on the processor, to enable the communication apparatus 1200 to perform the method described in the foregoing method embodiments. Optionally, the memory may further store data. Optionally, the processor may further store instructions and/or data. The processor and the memory may be separately disposed, or may be integrated together. For example, various correspondences described in the foregoing method embodiments may be stored in the memory, or may be stored in the processor.

The communication apparatus 1200 may further include a transceiver 1205 and/or an antenna 1206. The processor 1201 may be referred to as a processing unit, and controls the communication apparatus (a terminal or a network device). The transceiver 1205 may be referred to as a transceiver unit, a transceiver machine, a transceiver circuit, a transceiver, or the like, and is configured to implement the receiving and sending functions of the communication apparatus.

In a possible design, a communication apparatus 1200 (for example, an integrated circuit, a wireless device, a circuit module, a network device, a terminal, a chip, or a chip system) may include a processor 1201 and a transceiver 1205. The transceiver 1205 receives control information from a communication device, where the communication device may be a network device, or may be a terminal. The processor 1201 determines at least one first time subunit and at least one second time subunit based on the control information, where the at least one first time subunit and the at least one second time subunit are included in the at least one time unit. The transceiver 1205 receives first data in the at least one first time subunit, and receives second data in the at least one second time subunit. Optionally, the time unit is a slot, and the time subunit is a slot or a symbol. Optionally, the at least one time unit is included in a time unit aggregation.

According to the communication apparatus provided in this embodiment of this application, different time domain resources for carrying different data can be determined in the at least one time unit. Therefore, a time domain resource occupied for data receiving and sending can be flexibly adjusted based on an actual requirement for data transmission, thereby improving data transmission efficiency.

In some possible implementations of the communication apparatus 1200, the control information is used to indicate a position of the at least one first time subunit, or the control information is used to indicate a position of the at least one second time subunit. Alternatively, the control information is used to indicate a position of the at least one first time subunit and a position of the at least one second time subunit. Alternatively, the control information is used to indicate a quantity of the at least one first time subunit, or the control information is used to indicate a quantity of the at least one second time subunit. Alternatively, the control information is used to indicate a quantity of the at least one first time subunit and a quantity of the at least one second time subunit. Alternatively, the control information is used to indicate a ratio of a quantity of the first time subunits to a quantity of the second time subunits. Alternatively, the control information is used to indicate a ratio of a quantity of the second time subunits to a quantity of the first time subunits.

With reference to any one of the communication apparatus 1200 or the possible implementations of the communication apparatus 1200, in some possible implementations of the communication apparatus 1200, the control information may be carried by a PDCCH, a PSCCH, a system message, RRC signaling, or a MAC CE. Alternatively, the control information may be carried by a plurality of the foregoing items.

With reference to any one of the communication apparatus 1200 or the possible implementations of the communication apparatus 1200, in some possible implementations of the communication apparatus 1200, the control information includes a bitmap (bitmap) used to indicate the at least one first time subunit and the at least one second time subunit. Optionally, a quantity of bits included in the bitmap is greater than or equal to a quantity of the at least one time unit. Optionally, a bit identified as 0 in the bitmap indicates the at least one first time subunit, and a bit identified as 1 in the bitmap indicates the at least one second time subunit. Alternatively, a bit identified as 1 in the bitmap indicates the at least one first time subunit, and a bit identified as 0 in the bitmap indicates the at least one second time subunit.

With reference to any one of the communication apparatus 1200 or the possible implementations of the communication apparatus 1200, in some possible implementations of the communication apparatus 1200, the transceiver 1205 receives first configuration information from the communication device, where the first configuration information is used to configure the at least one time unit. Alternatively, the transceiver 1205 receives first configuration information from the communication device, where the first configuration information is used to configure the at least one time unit, and a quantity of the at least one time unit is two or more than two. If the first configuration information from the communication device is not received, the quantity of the at least one time unit is one by default. Optionally, the first configuration information is used to configure the quantity of the at least one time unit. Optionally, the first configuration information may be carried by a PDCCH, a PSCCH, a system message, RRC signaling, or a MAC CE.

With reference to any one of the communication apparatus 1200 or the possible implementations of the communication apparatus 1200, in some possible implementations of the communication apparatus 1200, the first data is data corresponding to a first TB, and the second data is data corresponding to a second transport block TB. A time domain resource occupied for data receiving and sending may be flexibly adjusted based on amounts of data corresponding to different TBs. Therefore, data transmission efficiency and resource use efficiency can be improved.

With reference to any one of the communication apparatus 1200 or the possible implementations of the communication apparatus 1200, in some possible implementations of the communication apparatus 1200, the first data is data corresponding to a first HARQ process, and the second data is data corresponding to a second HARQ process. A time domain resource occupied for data receiving and sending may be flexibly adjusted based on amounts of data corresponding to different HARQ processes. Therefore, data transmission efficiency and resource use efficiency can be improved.

With reference to any one of the communication apparatus 1200 or the possible implementations of the communication apparatus 1200, in some possible implementations of the communication apparatus 1200, the first data is initially transmitted data, and the second data is retransmitted data. Alternatively, the first data is retransmitted data, and the second data is initially transmitted data. Alternatively, the first data is first initially transmitted data, and the second data is second initially transmitted data. Alternatively, the first data is first retransmitted data, and the second data is second retransmitted data. A time domain resource occupied for data receiving and sending may be flexibly adjusted based on amounts of the initially transmitted data and the retransmitted data. Therefore, data transmission efficiency and resource use efficiency can be improved.

With reference to any one of the communication apparatus 1200 or the possible implementations of the communication apparatus 1200, in some possible implementations of the communication apparatus 1200, the first data is data corresponding to a first RV, and the second data is data corresponding to a second RV. A time domain resource occupied for data receiving and sending may be flexibly adjusted based on amounts of data corresponding to different RVs. Therefore, data transmission efficiency and resource use efficiency can be improved.

With reference to any one of the communication apparatus 1200 or the possible implementations of the communication apparatus 1200, in some possible implementations of the communication apparatus 1200, the first data is data corresponding to a first service, and the second data is data corresponding to a second service. A time domain resource occupied for data receiving and sending may be flexibly adjusted based on amounts of data corresponding to different services. Therefore, data transmission efficiency and resource use efficiency can be improved.

With reference to any one of the communication apparatus 1200 or the possible implementations of the communication apparatus 1200, in some possible implementations of the communication apparatus 1200, the processor 1201 controls, based on the control information, the transceiver 1205 to receive the first data in the at least one first time subunit, and to receive the second data in the at least one second time subunit. The control information includes scheduling information of the first data and scheduling information of the second data, and the scheduling information includes one or more pieces of information such as resource allocation information and an MCS. In this implementation, signaling overheads for data scheduling can be reduced.

In another possible design, a communication apparatus 1200 (for example, an integrated circuit, a wireless device, a circuit module, a network device, a terminal, a chip, or a chip system) may include a transceiver 1205. The transceiver 1205 sends control information to a communication device, where the communication device may be a network device, or may be a terminal. The control information is used to indicate at least one first time subunit and at least one second time subunit, and the at least one first time subunit and the at least one second time subunit are included in the at least one time unit. The transceiver 1205 sends first data in the at least one first time subunit, and sends second data in the at least one second time subunit. Optionally, the time unit is a slot, and the time subunit is a slot or a symbol. Optionally, the at least one time unit is included in a time unit aggregation.

According to the method described in the foregoing embodiment, different time domain resources for carrying different data can be determined in the at least one time unit. Therefore, a time domain resource occupied for data receiving and sending can be flexibly adjusted based on an actual requirement for data transmission, thereby improving data transmission efficiency.

In some possible implementations of the communication apparatus 1200, the control information is used to indicate a position of the at least one first time subunit, or the control information is used to indicate a position of the at least one second time subunit. Alternatively, the control information is used to indicate a position of the at least one first time subunit and a position of the at least one second time subunit. Alternatively, the control information is used to indicate a quantity of the at least one first time subunit, or the control information is used to indicate a quantity of the at least one second time subunit. Alternatively, the control information is used to indicate a quantity of the at least one first time subunit and a quantity of the at least one second time subunit. Alternatively, the control information is used to indicate a ratio of a quantity of the first time subunits to a quantity of the second time subunits. Alternatively, the control information is used to indicate a ratio of a quantity of the second time subunits to a quantity of the first time subunits.

With reference to any one of the communication apparatus 1200 or the possible implementations of the communication apparatus 1200, in some possible implementations of the communication apparatus 1200, the control information may be carried by a PDCCH, a PSCCH, a system message, RRC signaling, or a MAC CE. Alternatively, the control information may be carried by a plurality of the foregoing items.

With reference to any one of the communication apparatus 1200 or the possible implementations of the communication apparatus 1200, in some possible implementations of the communication apparatus 1200, the control information includes a bitmap used to indicate the at least one first time subunit and the at least one second time subunit. Optionally, a quantity of bits included in the bitmap is greater than or equal to a quantity of the at least one time unit. Optionally, a bit identified as 0 in the bitmap indicates the at least one first time subunit, and a bit identified as 1 in the bitmap indicates the at least one second time subunit. Alternatively, a bit identified as 1 in the bitmap indicates the at least one first time subunit, and a bit identified as 0 in the bitmap indicates the at least one second time subunit.

With reference to any one of the communication apparatus 1200 or the possible implementations of the communication apparatus 1200, in some possible implementations of the communication apparatus 1200, the transceiver 1205 sends first configuration information to the communication device, where the first configuration information is used to configure the at least one time unit. Alternatively, the transceiver 1205 sends first configuration information to the communication device, where the first configuration information is used to configure the at least one time unit, and a quantity of the at least one time unit is two or more than two. If the first configuration information is not sent, the quantity of the at least one time unit is one by default. Optionally, the first configuration information is used to configure the quantity of the at least one time unit. Optionally, the first configuration information may be carried by a PDCCH, a PSCCH, a system message, RRC signaling, or a MAC CE.

With reference to any one of the communication apparatus 1200 or the possible implementations of the communication apparatus 1200, in some possible implementations of the communication apparatus 1200, the first data is data corresponding to a first TB, and the second data is data corresponding to a second transport block TB. A time domain resource occupied for data receiving and sending may be flexibly adjusted based on amounts of data corresponding to different TBs. Therefore, data transmission efficiency and resource use efficiency can be improved.

With reference to any one of the communication apparatus 1200 or the possible implementations of the communication apparatus 1200, in some possible implementations of the communication apparatus 1200, the first data is data corresponding to a first HARQ process, and the second data is data corresponding to a second HARQ process. A time domain resource occupied for data receiving and sending may be flexibly adjusted based on amounts of data corresponding to different HARQ processes. Therefore, data transmission efficiency and resource use efficiency can be improved.

With reference to any one of the communication apparatus 1200 or the possible implementations of the communication apparatus 1200, in some possible implementations of the communication apparatus 1200, the first data is initially transmitted data, and the second data is retransmitted data. Alternatively, the first data is retransmitted data, and the second data is initially transmitted data. Alternatively, the first data is first initially transmitted data, and the second data is second initially transmitted data. Alternatively, the first data is first retransmitted data, and the second data is second retransmitted data. A time domain resource occupied for data receiving and sending may be flexibly adjusted based on amounts of the initially transmitted data and the retransmitted data. Therefore, data transmission efficiency and resource use efficiency can be improved.

With reference to any one of the communication apparatus 1200 or the possible implementations of the communication apparatus 1200, in some possible implementations of the communication apparatus 1200, the first data is data corresponding to a first RV, and the second data is data corresponding to a second RV. A time domain resource occupied for data receiving and sending may be flexibly adjusted based on amounts of data corresponding to different RVs. Therefore, data transmission efficiency and resource use efficiency can be improved.

With reference to any one of the communication apparatus 1200 or the possible implementations of the communication apparatus 1200, in some possible implementations of the communication apparatus 1200, the first data is data corresponding to a first service, and the second data is data corresponding to a second service. A time domain resource occupied for data receiving and sending may be flexibly adjusted based on amounts of data corresponding to different services. Therefore, data transmission efficiency and resource use efficiency can be improved.

With reference to any one of the communication apparatus 1200 or the possible implementations of the communication apparatus 1200, in some possible implementations of the communication apparatus 1200, the control information includes scheduling information of the first data and scheduling information of the second data, and the scheduling information includes one or more pieces of information such as resource allocation information and an MCS. In this implementation, signaling overheads for data scheduling can be reduced.

The processor and the transceiver described in this application may be implemented on an integrated circuit (IC), an analog IC, a radio frequency integrated circuit RFIC, a hybrid signal IC, an application-specific integrated circuit (ASIC), a printed circuit board (printed circuit board, PCB), an electronic device, or the like. The processor and the transceiver may alternatively be manufactured by using various IC process technologies, for example, a complementary metal oxide semiconductor (CMOS), an N-type metal oxide semiconductor (NMOS), a P-type metal oxide semiconductor (PMOS), a bipolar junction transistor (BJT), a bipolar CMOS (BiCMOS), silicon germanium (SiGe), and gallium arsenide (GaAs).

In the descriptions of the foregoing embodiments, the communication apparatus is described by using the network device or the terminal as an example. However, a scope of the communication apparatus described in this application is not limited thereto, and a structure of the communication apparatus may not be limited by FIG. 12. The communication apparatus may be an independent device or may be a part of a relatively large device. For example, the device may be:

(1) an independent integrated circuit (IC), a chip, or a chip system or subsystem;

(2) a set including one or more ICs, where optionally, the IC set may further include a storage component configured to store data and/or instructions;
(3) an ASIC, for example, a modem;
(4) a module that can be embedded in another device;
(5) a receiver, a terminal, an intelligent terminal, a cellular phone, a wireless device, a handheld phone, a mobile unit, a vehicle-mounted device, a network device, a cloud device, an artificial intelligence device, or the like; or
(6) others or the like.

Figure 13:
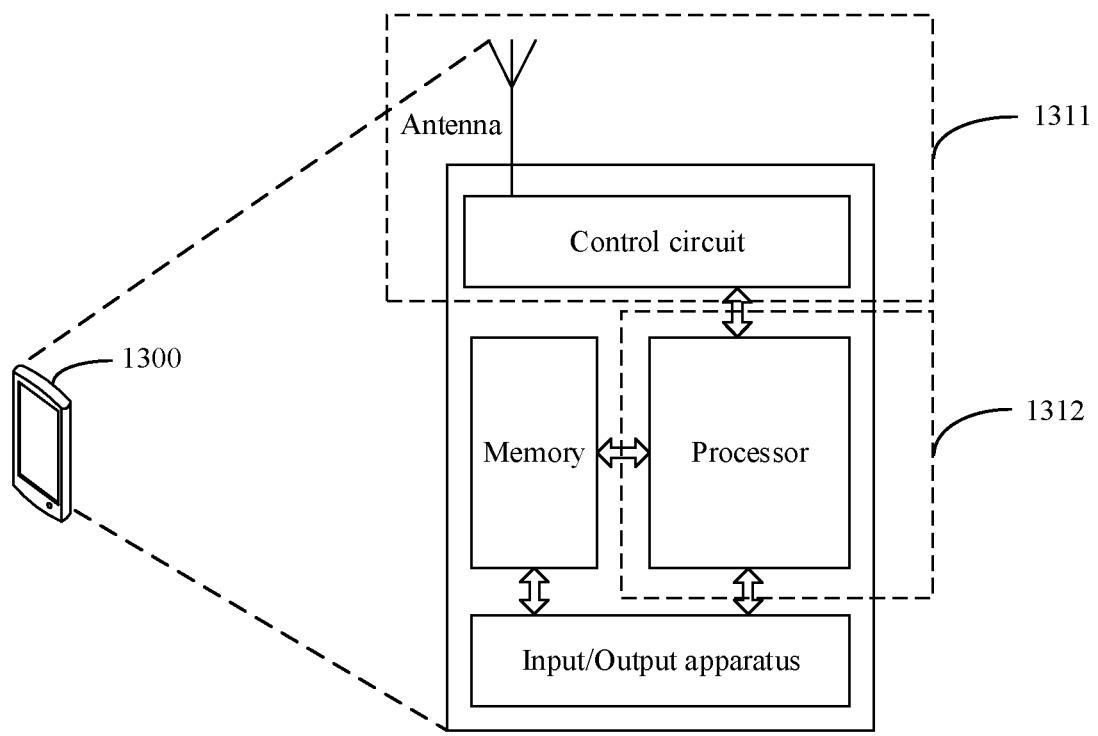
FIG. 13 is a schematic structural diagram of a terminal according to an embodiment of this application.

FIG. 13 is a schematic structural diagram of a terminal. The terminal is applicable to the system shown in FIG. 1. For ease of description, FIG. 13 shows only main components of the terminal. As shown in FIG. 13, the terminal 1300 includes a processor, a memory, a control circuit, an antenna, and an input/output apparatus. The processor is mainly configured to: process a communication protocol and communication data, control the entire terminal, execute a software program, and process data of the software program. The memory is configured to store the software program and the data. The radio frequency circuit is mainly configured to perform conversion between a baseband signal and a radio frequency signal, and process the radio frequency signal. The antenna is mainly configured to receive and send a radio frequency signal in an electromagnetic wave form. The input/output apparatus, for example, a touchscreen, a display screen, or a keyboard, is mainly configured to receive data entered by a user and output data to the user.

After user equipment is powered on, the processor may read a software program stored in a storage unit, parse and execute instructions of the software program, and process data of the software program. When data needs to be sent in a wireless manner, after performing baseband processing on the to-be-sent data, the processor outputs a baseband signal to the radio frequency circuit. After processing the baseband signal, the radio frequency circuit obtains a radio frequency signal and sends the radio frequency signal to the outside through the antenna in a form of an electromagnetic wave. When data is sent to the user equipment, the radio frequency circuit receives a radio frequency signal through the antenna, further converts the radio frequency signal into a baseband signal, and outputs the baseband signal to the processor, and the processor converts the baseband signal into data and processes the data.

A person skilled in the art may understand that, for ease of description, FIG. 13 shows only one memory and one processor. An actual terminal may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data. The central processing unit is mainly configured to control the entire terminal, execute the software program, and process the data of the software program. Functions of the baseband processor and the central processing unit are integrated into the processor in FIG. 13. A person skilled in the art may understand that the baseband processor and the central processing unit may alternatively be independent processors, and are interconnected by using technologies such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of software program. The processor executes the software program to implement a baseband processing function.

In an example, the antenna and the control circuit that have receiving and sending functions may be considered as a transceiver unit 1311 of the terminal 1300, and the processor having a processing function may be considered as a processing unit 1312 of the terminal 1300. As shown in FIG. 13, the terminal 1300 includes the transceiver unit 1311 and the processing unit 1312. The transceiver unit may also be referred to as a transceiver, a transceiver machine, a transceiver apparatus, or the like. Optionally, a component for implementing a receiving function in the transceiver unit 1311 may be considered as a receiving unit, and a component for implementing a sending function in the transceiver unit 1311 may be considered as a sending unit. In other words, the transceiver unit 1311 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like. Optionally, the receiving unit and the sending unit may be integrated into one unit, or may be a plurality of units independent of each other. The receiving unit and the sending unit may be at one geographical location, or may be scattered at a plurality of geographical locations.

Figure 14:
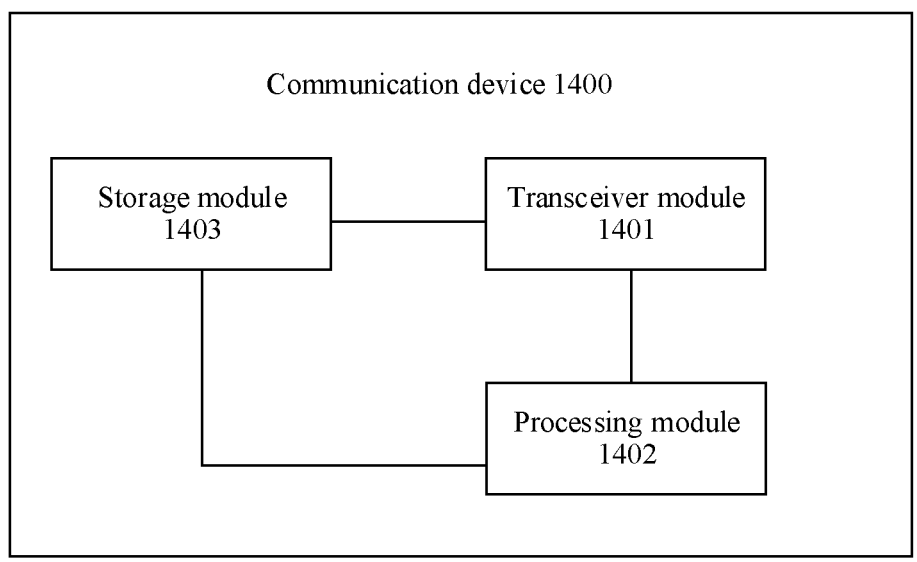
FIG. 14 is a schematic diagram of a communication device according to an embodiment of this application.

As shown in FIG. 14, another embodiment of this application provides a communication apparatus 1400. The communication apparatus may be a terminal (for example, a terminal in the system shown in FIG. 1) or a component (for example, an integrated circuit or a chip) of a terminal. Alternatively, the communication apparatus may be a network device (where for example, the communication apparatus is a base station device that can be used in the system in FIG. 1) or a component (for example, an integrated circuit or a chip) of a network device. Alternatively, the communication apparatus may be another communication module, configured to implement an operation corresponding to a communication device or node in the method embodiments of this application. The communication apparatus 1400 may include a processing module or processing unit 1402. The communication apparatus 1400 may further include a transceiver module or transceiver unit 1401 and/or a storage module or storage unit 1403.

In a possible design, one or more modules in FIG. 14 may be implemented by one or more processors, may be implemented by one or more processors and memories, may be implemented by one or more processors and transceivers, or may be implemented by one or more processors, memories, and transceivers. This is not limited in the embodiments of this application. The processor, the memory, and the transceiver may be separately disposed, or may be integrated together.

The communication apparatus has a function of implementing the terminal described in the embodiments of this application. For example, the communication apparatus includes modules, units, or means that are of the terminal and that correspond to the steps performed by the terminal described in the embodiments of this application, and the functions, units, or means may be implemented by software, may be implemented by hardware, or may be implemented by hardware executing corresponding software. For details, refer to corresponding descriptions in the foregoing corresponding method embodiments.

Alternatively, the communication apparatus has a function of implementing the network device described in the embodiments of this application. For example, the communication apparatus includes corresponding modules, units, or means that are of the network device and that correspond to the steps performed by the network device described in the embodiments of this application, and the functions, units, or means may be implemented by software, may be implemented by hardware, or may be implemented by hardware executing corresponding software. For details, refer to corresponding descriptions in the foregoing corresponding method embodiments.

Optionally, the modules in the communication apparatus 1400 in this embodiment of this application may be configured to perform the method described in FIG. 3, FIG. 7, FIG. 8, FIG. 9, FIG. 10, or FIG. 11 in the embodiments of this application.

In a possible design, a communication apparatus 1400 may include a transceiver module 1401 and a processing module 1402. The transceiver module 1401 receives control information from a communication device, where the communication device may be a network device, or may be a terminal. The processing module 1402 determines at least one first time subunit and at least one second time subunit based on the control information, where the at least one first time subunit and the at least one second time subunit are included in the at least one time unit. The transceiver module 1401 receives first data in the at least one first time subunit, and receives second data in the at least one second time subunit. Optionally, the time unit is a slot, and the time subunit is a slot or a symbol. Optionally, the at least one time unit is included in a time unit aggregation.

According to the communication apparatus provided in this embodiment of this application, different time domain resources for carrying different data can be determined in the at least one time unit. Therefore, a time domain resource occupied for data receiving and sending can be flexibly adjusted based on an actual requirement for data transmission, thereby improving data transmission efficiency.

In some possible implementations of the communication apparatus 1400, the control information is used to indicate a position of the at least one first time subunit, or the control information is used to indicate a position of the at least one second time subunit. Alternatively, the control information is used to indicate a position of the at least one first time subunit and a position of the at least one second time subunit. Alternatively, the control information is used to indicate a quantity of the at least one first time subunit, or the control information is used to indicate a quantity of the at least one second time subunit. Alternatively, the control information is used to indicate a quantity of the at least one first time subunit and a quantity of the at least one second time subunit. Alternatively, the control information is used to indicate a ratio of a quantity of the first time subunits to a quantity of the second time subunits. Alternatively, the control information is used to indicate a ratio of a quantity of the second time subunits to a quantity of the first time subunits.

With reference to any one of the communication apparatus 1400 or the possible implementations of the communication apparatus 1400, in some possible implementations of the communication apparatus 1400, the control information may be carried by a PDCCH, a PSCCH, a system message, RRC signaling, or a MAC CE. Alternatively, the control information may be carried by a plurality of the foregoing items.

With reference to any one of the communication apparatus 1400 or the possible implementations of the communication apparatus 1400, in some possible implementations of the communication apparatus 1400, the control information includes a bitmap (bitmap) used to indicate the at least one first time subunit and the at least one second time subunit. Optionally, a quantity of bits included in the bitmap is greater than or equal to a quantity of the at least one time unit. Optionally, a bit identified as 0 in the bitmap indicates the at least one first time subunit, and a bit identified as 1 in the bitmap indicates the at least one second time subunit. Alternatively, a bit identified as 1 in the bitmap indicates the at least one first time subunit, and a bit identified as 0 in the bitmap indicates the at least one second time subunit.

With reference to any one of the communication apparatus 1400 or the possible implementations of the communication apparatus 1400, in some possible implementations of the communication apparatus 1400, the transceiver module 1401 receives first configuration information from the communication device, where the first configuration information is used to configure the at least one time unit. Alternatively, the transceiver module 1401 receives first configuration information from the communication device, where the first configuration information is used to configure the at least one time unit, and a quantity of the at least one time unit is two or more than two. If the first configuration information from the communication device is not received, the quantity of the at least one time unit is one by default. Optionally, the first configuration information is used to configure the quantity of the at least one time unit. Optionally, the first configuration information may be carried by a PDCCH, a PSCCH, a system message, RRC signaling, or a MAC CE.

With reference to any one of the communication apparatus 1400 or the possible implementations of the communication apparatus 1400, in some possible implementations of the communication apparatus 1400, the first data is data corresponding to a first TB, and the second data is data corresponding to a second transport block TB. A time domain resource occupied for data receiving and sending may be flexibly adjusted based on amounts of data corresponding to different TBs. Therefore, data transmission efficiency and resource use efficiency can be improved.

With reference to any one of the communication apparatus 1400 or the possible implementations of the communication apparatus 1400, in some possible implementations of the communication apparatus 1400, the first data is data corresponding to a first HARQ process, and the second data is data corresponding to a second HARQ process. A time domain resource occupied for data receiving and sending may be flexibly adjusted based on amounts of data corresponding to different HARQ processes. Therefore, data transmission efficiency and resource use efficiency can be improved.

With reference to any one of the communication apparatus 1400 or the possible implementations of the communication apparatus 1400, in some possible implementations of the communication apparatus 1400, the first data is initially transmitted data, and the second data is retransmitted data. Alternatively, the first data is retransmitted data, and the second data is initially transmitted data. Alternatively, the first data is first initially transmitted data, and the second data is second initially transmitted data. Alternatively, the first data is first retransmitted data, and the second data is second retransmitted data. A time domain resource occupied for data receiving and sending may be flexibly adjusted based on amounts of the initially transmitted data and the retransmitted data. Therefore, data transmission efficiency and resource use efficiency can be improved.

With reference to any one of the communication apparatus 1400 or the possible implementations of the communication apparatus 1400, in some possible implementations of the communication apparatus 1400, the first data is data corresponding to a first RV, and the second data is data corresponding to a second RV. A time domain resource occupied for data receiving and sending may be flexibly adjusted based on amounts of data corresponding to different RVs. Therefore, data transmission efficiency and resource use efficiency can be improved.

With reference to any one of the communication apparatus 1400 or the possible implementations of the communication apparatus 1400, in some possible implementations of the communication apparatus 1400, the first data is data corresponding to a first service, and the second data is data corresponding to a second service. A time domain resource occupied for data receiving and sending may be flexibly adjusted based on amounts of data corresponding to different services. Therefore, data transmission efficiency and resource use efficiency can be improved.

With reference to any one of the communication apparatus 1400 or the possible implementations of the communication apparatus 1400, in some possible implementations of the communication apparatus 1400, the processing module 1402 controls, based on the control information, the transceiver module 1401 to receive the first data in the at least one first time subunit, and to receive the second data in the at least one second time subunit. The control information includes scheduling information of the first data and scheduling information of the second data, and the scheduling information includes one or more pieces of information such as resource allocation information and an MCS. In this implementation, signaling overheads for data scheduling can be reduced.

In another possible design, a communication apparatus 1400 may include a transceiver module 1401. The transceiver module 1401 sends control information to a communication device, where the communication device may be a network device, or may be a terminal. The control information is used to indicate at least one first time subunit and at least one second time subunit, and the at least one first time subunit and the at least one second time subunit are included in the at least one time unit. The transceiver module 1401 sends first data in the at least one first time subunit, and sends second data in the at least one second time subunit. Optionally, the time unit is a slot, and the time subunit is a slot or a symbol. Optionally, the at least one time unit is included in a time unit aggregation.

According to the method described in the foregoing embodiment, different time domain resources for carrying different data can be determined in the at least one time unit. Therefore, a time domain resource occupied for data receiving and sending can be flexibly adjusted based on an actual requirement for data transmission, thereby improving data transmission efficiency.

In some possible implementations of the communication apparatus 1400, the control information is used to indicate a position of the at least one first time subunit, or the control information is used to indicate a position of the at least one second time subunit. Alternatively, the control information is used to indicate a position of the at least one first time subunit and a position of the at least one second time subunit. Alternatively, the control information is used to indicate a quantity of the at least one first time subunit, or the control information is used to indicate a quantity of the at least one second time subunit. Alternatively, the control information is used to indicate a quantity of the at least one first time subunit and a quantity of the at least one second time subunit. Alternatively, the control information is used to indicate a ratio of a quantity of the first time subunits to a quantity of the second time subunits. Alternatively, the control information is used to indicate a ratio of a quantity of the second time subunits to a quantity of the first time subunits.

With reference to any one of the communication apparatus 1400 or the possible implementations of the communication apparatus 1400, in some possible implementations of the communication apparatus 1400, the control information may be carried by a PDCCH, a PSCCH, a system message, RRC signaling, or a MAC CE. Alternatively, the control information may be carried by a plurality of the foregoing items.

With reference to any one of the communication apparatus 1400 or the possible implementations of the communication apparatus 1400, in some possible implementations of the communication apparatus 1400, the control information includes a bitmap used to indicate the at least one first time subunit and the at least one second time subunit. Optionally, a quantity of bits included in the bitmap is greater than or equal to a quantity of the at least one time unit. Optionally, a bit identified as 0 in the bitmap indicates the at least one first time subunit, and a bit identified as 1 in the bitmap indicates the at least one second time subunit. Alternatively, a bit identified as 1 in the bitmap indicates the at least one first time subunit, and a bit identified as 0 in the bitmap indicates the at least one second time subunit.

With reference to any one of the communication apparatus 1400 or the possible implementations of the communication apparatus 1400, in some possible implementations of the communication apparatus 1400, the transceiver module 1401 sends first configuration information to the communication device, where the first configuration information is used to configure the at least one time unit. Alternatively, the transceiver module 1401 sends first configuration information to the communication device, where the first configuration information is used to configure the at least one time unit, and a quantity of the at least one time unit is two or more than two. If the first configuration information is not sent, the quantity of the at least one time unit is one by default. Optionally, the first configuration information is used to configure the quantity of the at least one time unit. Optionally, the first configuration information may be carried by a PDCCH, a PSCCH, a system message, RRC signaling, or a MAC CE.

With reference to any one of the communication apparatus 1400 or the possible implementations of the communication apparatus 1400, in some possible implementations of the communication apparatus 1400, the first data is data corresponding to a first TB, and the second data is data corresponding to a second transport block TB. A time domain resource occupied for data receiving and sending may be flexibly adjusted based on amounts of data corresponding to different TBs. Therefore, data transmission efficiency and resource use efficiency can be improved.

With reference to any one of the communication apparatus 1400 or the possible implementations of the communication apparatus 1400, in some possible implementations of the communication apparatus 1400, the first data is data corresponding to a first HARQ process, and the second data is data corresponding to a second HARQ process. A time domain resource occupied for data receiving and sending may be flexibly adjusted based on amounts of data corresponding to different HARQ processes. Therefore, data transmission efficiency and resource use efficiency can be improved.

With reference to any one of the communication apparatus 1400 or the possible implementations of the communication apparatus 1400, in some possible implementations of the communication apparatus 1400, the first data is initially transmitted data, and the second data is retransmitted data. Alternatively, the first data is retransmitted data, and the second data is initially transmitted data. Alternatively, the first data is first initially transmitted data, and the second data is second initially transmitted data. Alternatively, the first data is first retransmitted data, and the second data is second retransmitted data. A time domain resource occupied for data receiving and sending may be flexibly adjusted based on amounts of the initially transmitted data and the retransmitted data. Therefore, data transmission efficiency and resource use efficiency can be improved.

With reference to any one of the communication apparatus 1400 or the possible implementations of the communication apparatus 1400, in some possible implementations of the communication apparatus 1400, the first data is data corresponding to a first RV, and the second data is data corresponding to a second RV. A time domain resource occupied for data receiving and sending may be flexibly adjusted based on amounts of data corresponding to different RVs. Therefore, data transmission efficiency and resource use efficiency can be improved.

With reference to any one of the communication apparatus 1400 or the possible implementations of the communication apparatus 1400, in some possible implementations of the communication apparatus 1400, the first data is data corresponding to a first service, and the second data is data corresponding to a second service. A time domain resource occupied for data receiving and sending may be flexibly adjusted based on amounts of data corresponding to different services. Therefore, data transmission efficiency and resource use efficiency can be improved.

With reference to any one of the communication apparatus 1400 or the possible implementations of the communication apparatus 1400, in some possible implementations of the communication apparatus 1400, the control information includes scheduling information of the first data and scheduling information of the second data, and the scheduling information includes one or more pieces of information such as resource allocation information and an MCS. In this implementation, signaling overheads for data scheduling can be reduced.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in the embodiments of this application may also correspondingly implement these features or functions. Details are not described herein.

A person skilled in the art may further understand that various illustrative logical blocks (illustrative logical block) and steps (step) that are listed in the embodiments of this application may be implemented by using electronic hardware, computer software, or a combination thereof. Whether the functions are implemented by using hardware or software depends on particular applications and a design requirement of an entire system. A person skilled in the art may use various methods to implement the described functions for each particular application, but it should not be considered that the implementation goes beyond the scope of the embodiments of this application.

The technologies described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a digital signal processor (DSP), a digital signal processing device (DSPD), an application-specific integrated circuit (ASIC), a programmable logic device (PLD), a field-programmable gate array (FPGA), or another programmable logic apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. Alternatively, the processor may be implemented by a combination of computing apparatuses, such as a digital signal processor and a microprocessor, a plurality of microprocessors, one or more microprocessors in combination with a digital signal processor core, or any other similar configuration.

A person of ordinary skill in the art may understand that various reference numerals such as "first" and "second" in this application are merely used for differentiation for ease of description, and are not used to limit the scope of the embodiments of this application, or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" refers to one or more. At least two refers to two or more. "At least one", "any one", or a similar expression thereof refers to any combination of these items, including a singular item (piece) or any combination of plural items (pieces). For example, at least one (piece, or type) of a, b, or c may represent: a, b, c, a and b, a and c, b and c, or a, b, and c, where a, b, and c may be singular or plural.

Steps of the methods or algorithms described in the embodiments of this application may be directly embedded into hardware, instructions executed by a processor, or a combination thereof. The memory may be a RAM memory, a flash memory, a ROM memory, an EPROM memory, an EEPROM memory, a register, a hard disk, a removable magnetic disk, a CD-ROM, or a storage medium of any other form in the art. For example, the memory may connect to a processor, so that the processor may read information from the memory and write information to the memory. Optionally, the memory may further be integrated into the processor. The processor and the memory may be arranged in an ASIC, and the ASIC may be arranged in a terminal. Optionally, the processor and the memory may alternatively be disposed in different components of a terminal.

All or some of the foregoing embodiments may be implemented by using software, hardware, firmware, or any combination thereof. When the software is used for implementation, all or some of the embodiments may be implemented in a form of a computer program product. The computer program product includes one or more computer instructions. When the computer program instructions are loaded and executed on a computer, all or some of the procedure or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data packet center to another website, computer, server, or data packet center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data packet storage device, such as a server or a data packet center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like. The foregoing combination shall also be included in the protection scope of the computer-readable medium.

For same or similar parts in the embodiments of this application, refer to each other. In the embodiments of this application and the implementations/implementation methods/implementation methods in the embodiments, unless otherwise specified or a logical conflict occurs, terms and/or descriptions are consistent and may be mutually referenced between different embodiments and between the implementations/implementation methods/implementation methods in the embodiments. Technical features in the different embodiments and the implementations/implementation methods/implementation methods in the embodiments may be combined to form a new embodiment, implementation, implementation method, or implementation method according to an internal logical relationship thereof. The foregoing implementations of this application do not constitute a limitation on the protection scope of this application.

What is claimed is:

1. A communication method performed by an apparatus, the method comprising:
   receiving first configuration information from a communication device;
   configuring at least one time unit based on the first configuration information;
   receiving control information from the communication device;
   determining at least one first time subunit and at least one second time subunit based on at least a bitmap in the control information, wherein the at least one first time subunit and the at least one second time subunit are included in the at least one time unit, the bitmap is used to indicate the least one first time subunit and the at least one second time subunit, a bit identified as a first value in the bitmap indicates the at least one first time subunit, and a bit identified as a second value in the bitmap indicates the at least one second time subunit; and
   receiving first data in the at least one first time subunit, and receiving second data in the at least one second time subunit, wherein the first data and the second data correspond to different transport blocks (TBs), each time unit is a slot, each time subunit is a symbol, and the at least one first time subunit and the at least one second time subunit have different time domain resources.

2. The method according to claim 1, wherein the first data corresponds to a first hybrid automatic repeat request (HARQ) process, and the second data corresponds to a second HARQ process.

3. The method according to claim 1, the first data and second data satisfying one of the following conditions:
   the first data is initially transmitted data, and the second data is retransmitted data;
   the first data is retransmitted data, and the second data is initially transmitted data;
   the first data is initially transmitted data, and the second data is initially transmitted data; or
   the first data is retransmitted data, and the second data is retransmitted data.

4. The method according to claim 1, wherein the first data is data corresponding to a first redundancy version (RV) and the second data is data corresponding to a second RV.

5. The method according to claim 1, wherein the first data is data corresponding to a first service, and the second data is data corresponding to a second service.

6. The method according to claim 1, wherein the first configuration information is carried by at least one of the following: a physical downlink control channel (PDCCH), a system message, radio resource control (RRC) signaling, or a media access control (MAC) control element (CE).

7. An apparatus, comprising:
   one or more processors;
   a non-transitory memory coupled to the one or more processors, the non-transitory memory storing a program to be executed by the one or more processors and including instructions that cause the apparatus to:
   receive first configuration information from a communication device;
   configure at least one time unit based upon the first configuration information;
   receive control information from the communication device;
   determine at least one first time subunit and at least one second time subunit based on at least a bitmap in the control information, wherein the at least one time unit comprises the at least one first time subunit and the at least one second time subunit, the bitmap is used to indicate the least one first time subunit and the at least one second time subunit, a bit identified as a first value in the bitmap indicates the at least one first time subunit, and a bit identified as a second value in the bitmap indicates the at least one second time subunit; and
   receive first data in the at least one first time subunit and second data in the at least one second time subunit, wherein the first data and the second data correspond to different transport blocks (TBs), each time unit is a slot, each time subunit is a symbol, and the at least one first time subunit and the at least one second time subunit have different time domain resources.

8. The apparatus according to claim 7, wherein the first data is data corresponding to a first hybrid automatic repeat request (HARQ) process, and the second data is data corresponding to a second HARQ process.

9. The apparatus according to claim 7, the first data and second data satisfying one of the following conditions:
the first data is initially transmitted data, and the second data is retransmitted data;
the first data is retransmitted data, and the second data is initially transmitted data;
the first data is initially transmitted data, and the second data is initially transmitted data; or
the first data is retransmitted data, and the second data is retransmitted data.

10. The apparatus according to claim 7, wherein the first data is data corresponding to a first redundancy version (RV) and the second data is data corresponding to a second RV.

11. The apparatus according to claim 7, wherein the first data is data corresponding to a first service, and the second data is data corresponding to a second service.

12. The apparatus according to claim 7, wherein the first configuration information is carried by at least one of the following: a physical downlink control channel (PDCCH), a system message, radio resource control (RRC) signaling, or a media access control (MAC) control element (CE).

13. A non-transitory computer readable medium storing instructions that, when executed by one or more processors of a device, cause the device to:
receive first configuration information from a communication device
configure at least one time unit based on the first configuration information;
receive control information from the communication device;
determine at least one first time subunit and at least one second time subunit based on at least a bitmap in the control information, wherein the at least one time unit comprises the at least one first time subunit and the at least one second time subunit, the bitmap is used to indicate the least one first time subunit and the at least one second time subunit, a bit identified as a first value in the bitmap indicates the at least one first time subunit, and a bit identified as a second value in the bitmap indicates the at least one second time subunit; and
receive first data in the at least one first time subunit, and receive second data in the at least one second time subunit, wherein the first data and the second data correspond to different transport blocks (TBs), each time unit is a slot, each time subunit is a symbol, and the at least one first time subunit and the at least one second time subunit have different time domain resources.

14. The non-transitory computer readable medium according to claim 13, wherein the first data is data corresponding to a first hybrid automatic repeat request (HARQ) process, and the second data is data corresponding to a second HARQ process.

15. The non-transitory computer readable medium according to claim 13, the first data and second data satisfying one of the following conditions:
the first data is initially transmitted data, and the second data is retransmitted data;
the first data is retransmitted data, and the second data is initially transmitted data;
the first data is initially transmitted data, and the second data is initially transmitted data; or
the first data is retransmitted data, and the second data is retransmitted data.

16. The non-transitory computer readable medium according to claim 13, wherein the first data is data corresponding to a first redundancy version (RV), and the second data is data corresponding to a second RV.

17. The non-transitory computer readable medium according to claim 13, wherein the first data is data corresponding to a first service, and the second data is data corresponding to a second service.

* * * * *